US011920398B2

(12) United States Patent
Ueshima et al.

(10) Patent No.: US 11,920,398 B2
(45) Date of Patent: Mar. 5, 2024

(54) OPENING/CLOSING MECHANISM AND DEVICE INCLUDING OPENING/CLOSING MECHANISM

(71) Applicant: FUJIFILM Business Innovation Corp., Tokyo (JP)

(72) Inventors: Akira Ueshima, Kanagawa (JP); Shuichi Nishide, Kanagawa (JP); Michiaki Yoshida, Kanagawa (JP); Keigo Shinoto, Kanagawa (JP); Wataru Nakamura, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 15 days.

(21) Appl. No.: 17/747,962

(22) Filed: May 18, 2022

(65) Prior Publication Data

US 2023/0203871 A1 Jun. 29, 2023

(30) Foreign Application Priority Data

Dec. 27, 2021 (JP) ................................. 2021-213128

(51) Int. Cl.
*E05F 15/63* (2015.01)

(52) U.S. Cl.
CPC ......... *E05F 15/63* (2015.01); *E05Y 2201/224* (2013.01); *E05Y 2201/706* (2013.01); *E05Y 2900/608* (2013.01)

(58) Field of Classification Search
None
See application file for complete search history.

(56) References Cited

U.S. PATENT DOCUMENTS 10,603,935 B1 3/2020 Yasui et al.
2011/0052253 A1* 3/2011 Nieda ................ G03G 21/1633 49/394
2011/0293326 A1* 12/2011 Tanabe ............... G03G 21/1633 399/124
2015/0185692 A1* 7/2015 Kurimoto .......... G03G 21/1619 399/110

FOREIGN PATENT DOCUMENTS

JP 2005326044 11/2005
JP 2006137110 6/2006
JP 4143568 9/2008
JP 6335950 5/2018
JP 2020154116 9/2020

* cited by examiner

*Primary Examiner* — Roy Y Yi
(74) *Attorney, Agent, or Firm* — JCIPRNET

(57) ABSTRACT

An opening/closing mechanism includes a first inclined portion disposed in an opening/closing body that opens/closes while a first shaft serves as a fulcrum in a main body, a second inclined portion disposed in the opening/closing body, and a swing portion that swings between the first inclined portion and the second inclined portion while a second shaft disposed in the main body serves as a fulcrum, in which during a closing operation of the opening/closing body, the swing portion applies a force in a closing direction of the opening/closing body by coming into contact with the first inclined portion, after applying a force in an opening direction of the opening/closing body by coming into contact with the second inclined portion.

20 Claims, 17 Drawing Sheets

OPENING/CLOSING MECHANISM AND DEVICE INCLUDING OPENING/CLOSING MECHANISM

CROSS-REFERENCE TO RELATED APPLICATIONS

This application is based on and claims priority under 35 USC 119 from Japanese Patent Application No. 2021-213128 filed Dec. 27, 2021.

BACKGROUND

(i) Technical Field

The present disclosure relates to an opening/closing mechanism and a device including an opening/closing mechanism.

(ii) Related Art

In JP2006-137110A, a technique is disclosed as follows. An opening/closing mechanism of a housing includes an opening/closing portion provided to be openable/closable with respect to a housing body, and at least two engagement portions provided in each of the housing body and the opening/closing portion and engaging with each other to hold the opening/closing portion and the housing body in a closed state.

In addition, JP2006-137110A also discloses the followings with regard to the opening/closing mechanism. In a case where the housing body and the opening/closing portion are in an equilibrium portion in a first engagement portion, an opening/closing behavior of the opening/closing portion follows a behavior of a second engagement portion of the two engagement portions. Furthermore, JP2006-137110A also discloses the followings with regard to the opening/closing mechanism. Based on a positional relationship between the housing body and the opening/closing portion, the second engagement portion is provided with an extruding region for extruding the opening/closing portion from the housing body and a drawing region provided via a boundary portion with respect to the extruding region and drawing the opening/closing portion into the housing body.

JP6335950B discloses an image forming device including an image forming device body, an opening/closing member openable/closable with respect to the device body, a lock mechanism provided in the device body, having a pivotable lock member and a biasing member for biasing the lock member, and locking the opening/closing member at a lock position, and an engagement member provided in the opening/closing member, and engaging with the lock member.

JP4143568B discloses a refrigerator door opening/closing device including a door supported to be openable/closable, a drawing member provided in the door, and a door opening/closing unit that is attachable to and detachable from the drawing member.

In addition, JP4143568B also discloses the door opening/closing unit including a door opening member that causes a motor to rotate forward so that the door is moved in an opening direction via the drawing member, and a door closing member that causes the motor to rotate rearward so that the door is moved in a closing direction via the drawing member, and a torque limiting unit that limits a torque in a driving force transmission path between the motor and the door closing member.

SUMMARY

Aspects of non-limiting embodiments of the present disclosure relate to an opening/closing mechanism and a device including the opening/closing mechanism which can close an opening/closing body that opens/closes to cover and expose a portion of a main body without being stopped before the opening/closing body reaches a normal closing position, when the opening/closing body is closed.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an opening/closing mechanism including a first inclined portion disposed in an opening/closing body that opens/closes while a first shaft serves as a fulcrum in a main body, a second inclined portion disposed in the opening/closing body, and a swing portion that swings between the first inclined portion and the second inclined portion while a second shaft disposed in the main body serves as a fulcrum, in which during a closing operation of the opening/closing body, the swing portion applies a force in a closing direction of the opening/closing body by coming into contact with the first inclined portion, after applying a force in an opening direction of the opening/closing body by coming into contact with the second inclined portion.

BRIEF DESCRIPTION OF THE DRAWINGS

Exemplary embodiment(s) of the present invention will be described in detail based on the following figures, wherein.

Figure 7:
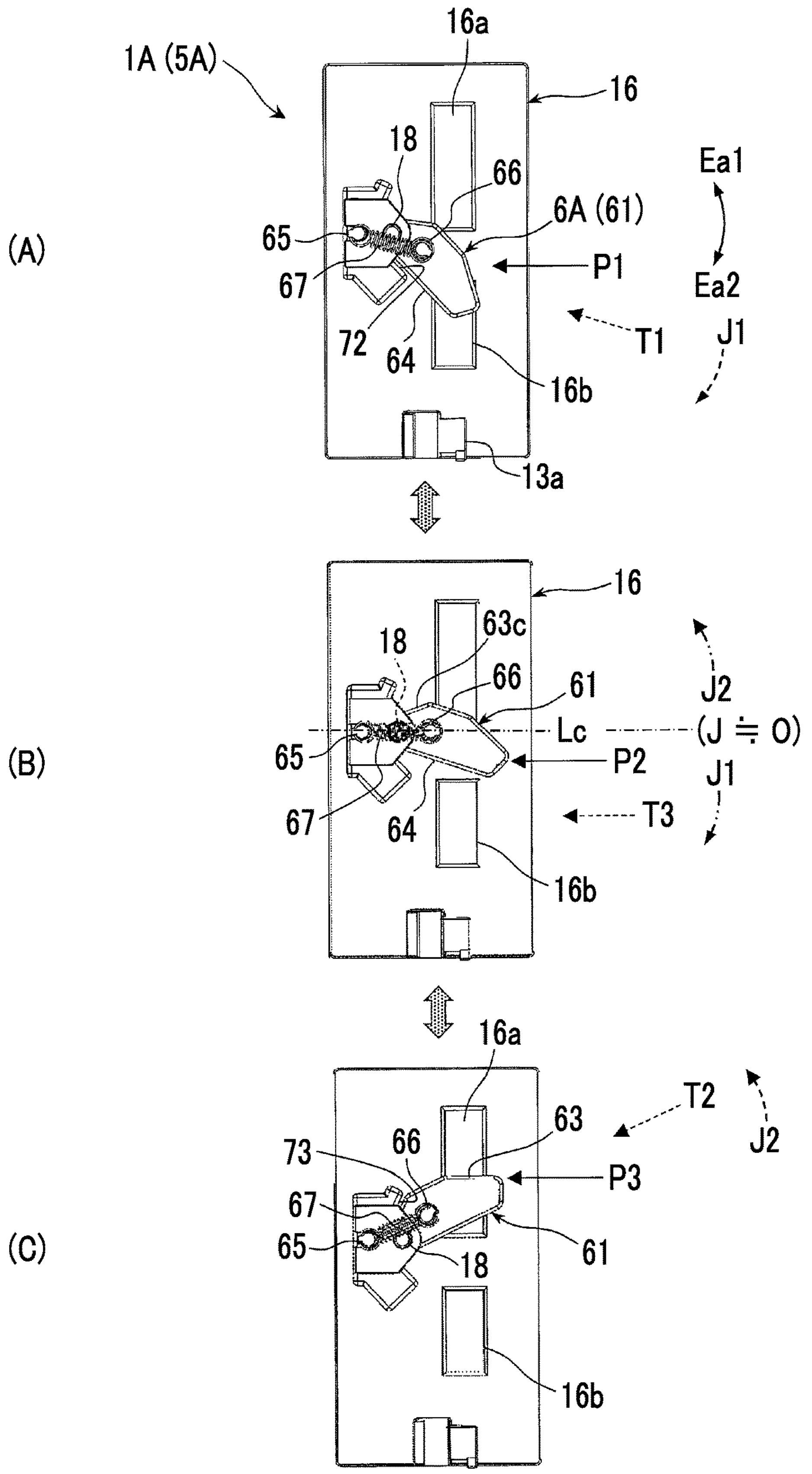
Figure 8A:
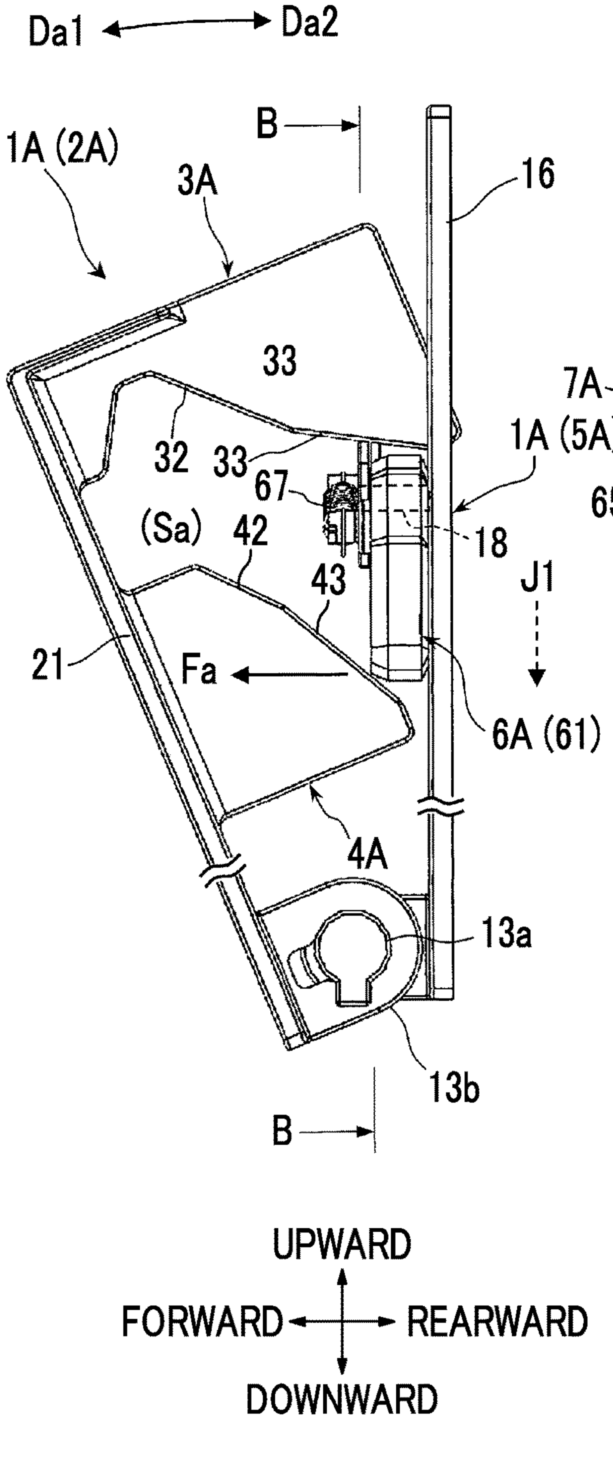
Figure 8B:
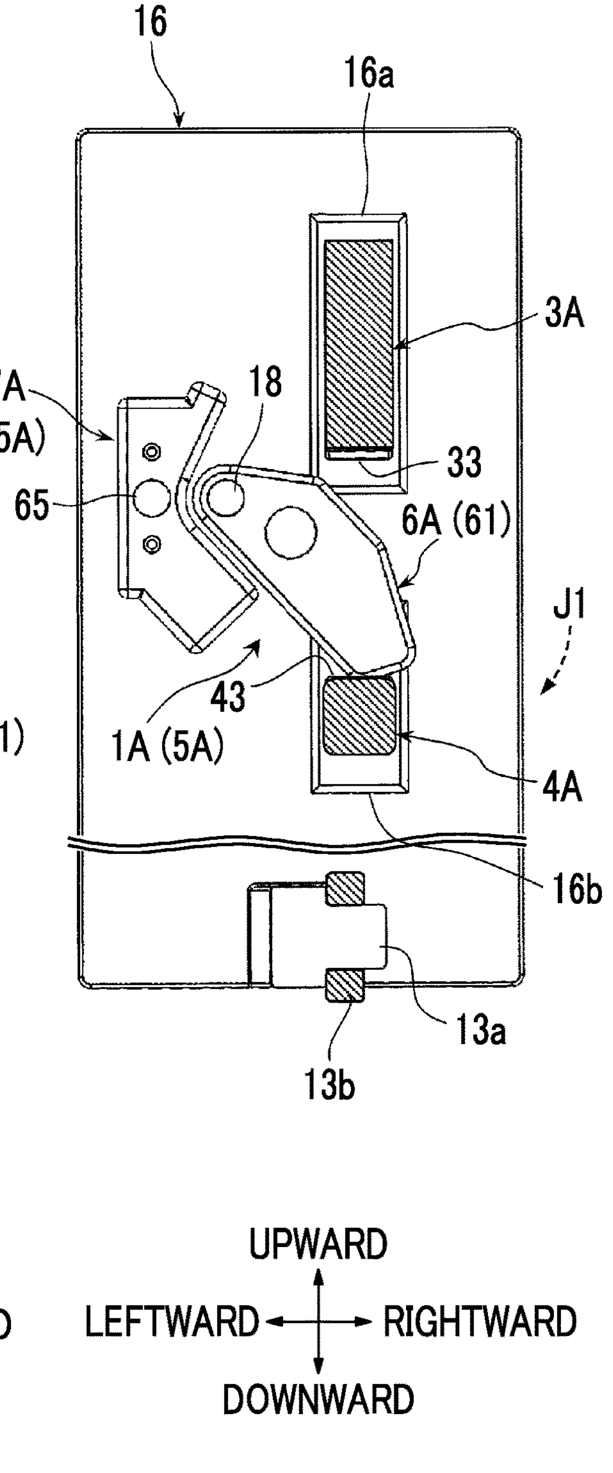
Figure 9A:
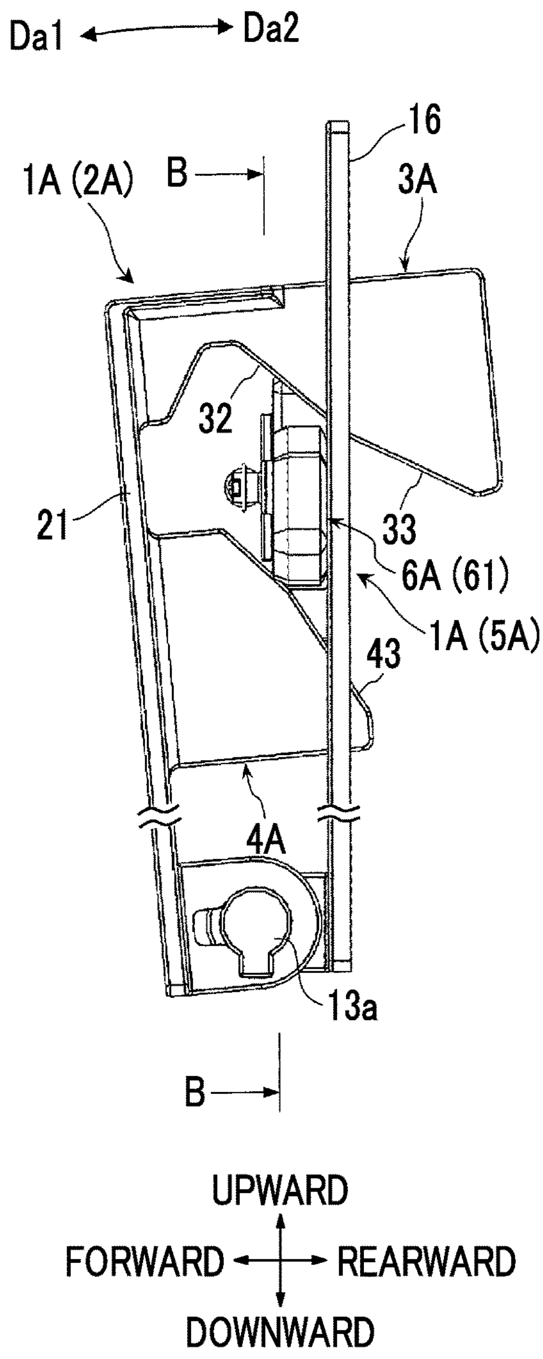
Figure 9B:
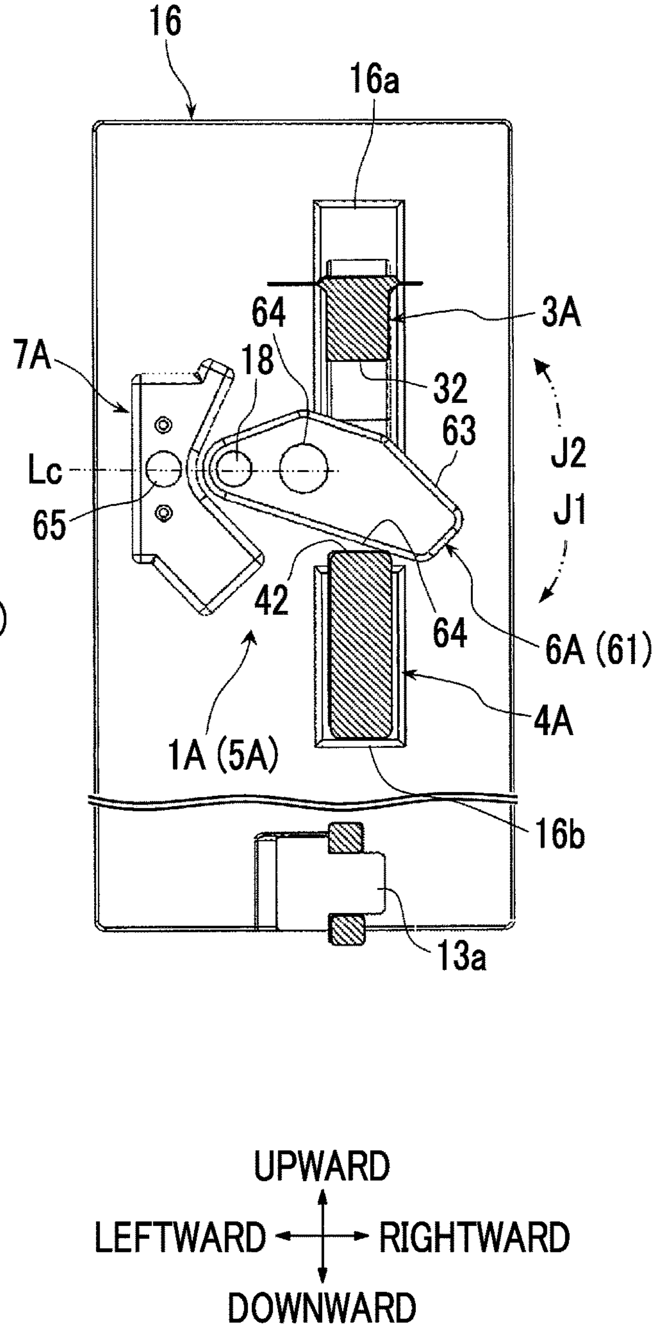
Figure 10A:
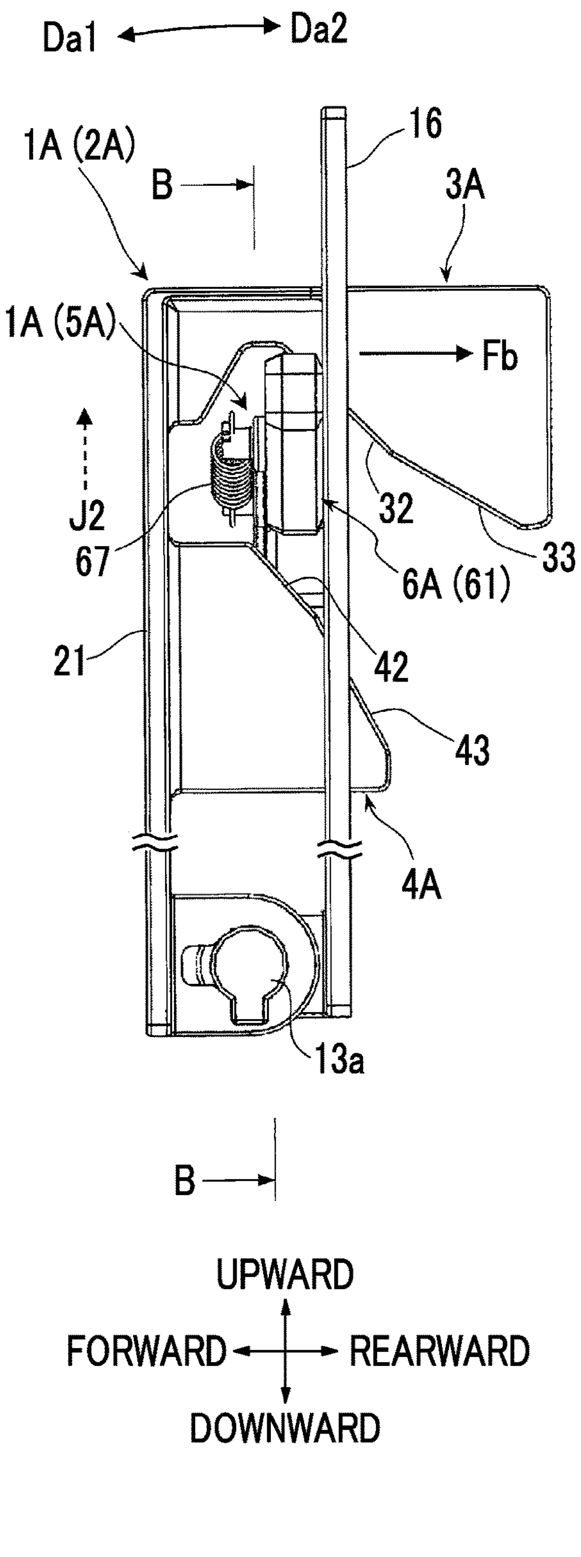
Figure 10B:
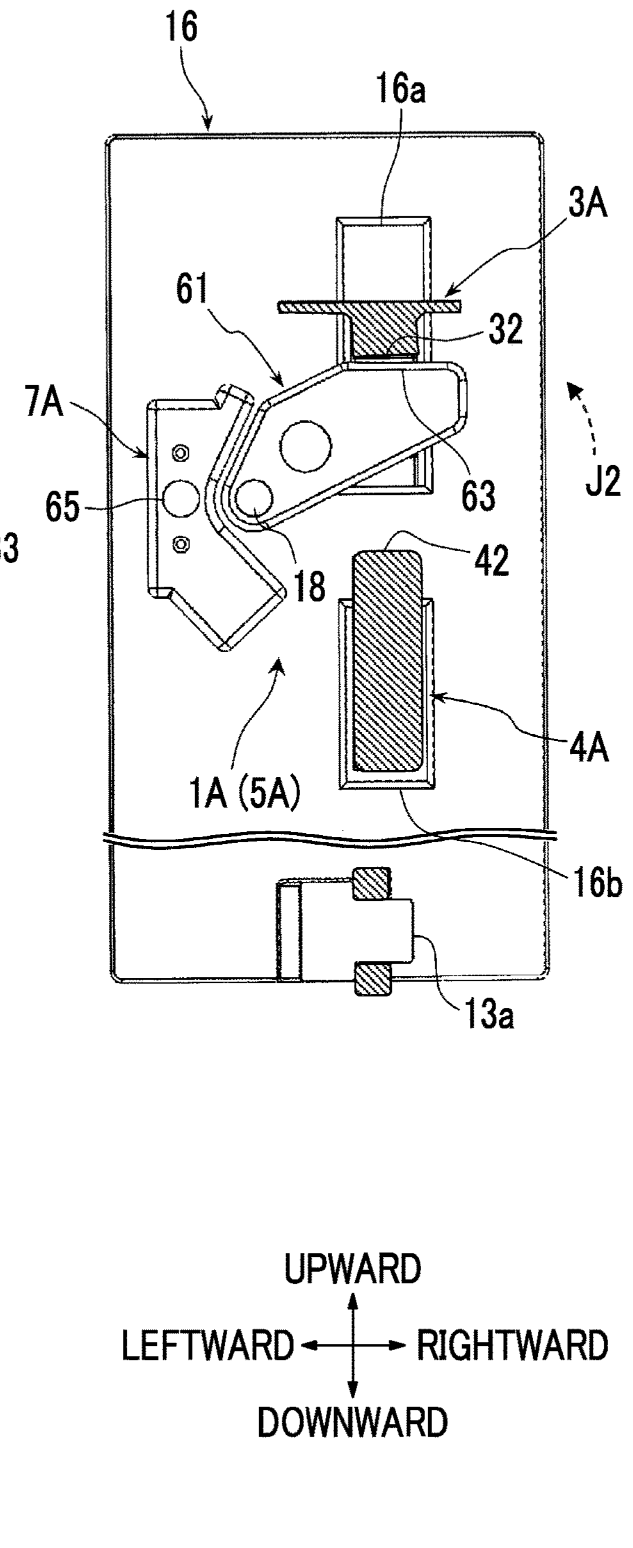
Figure 11:
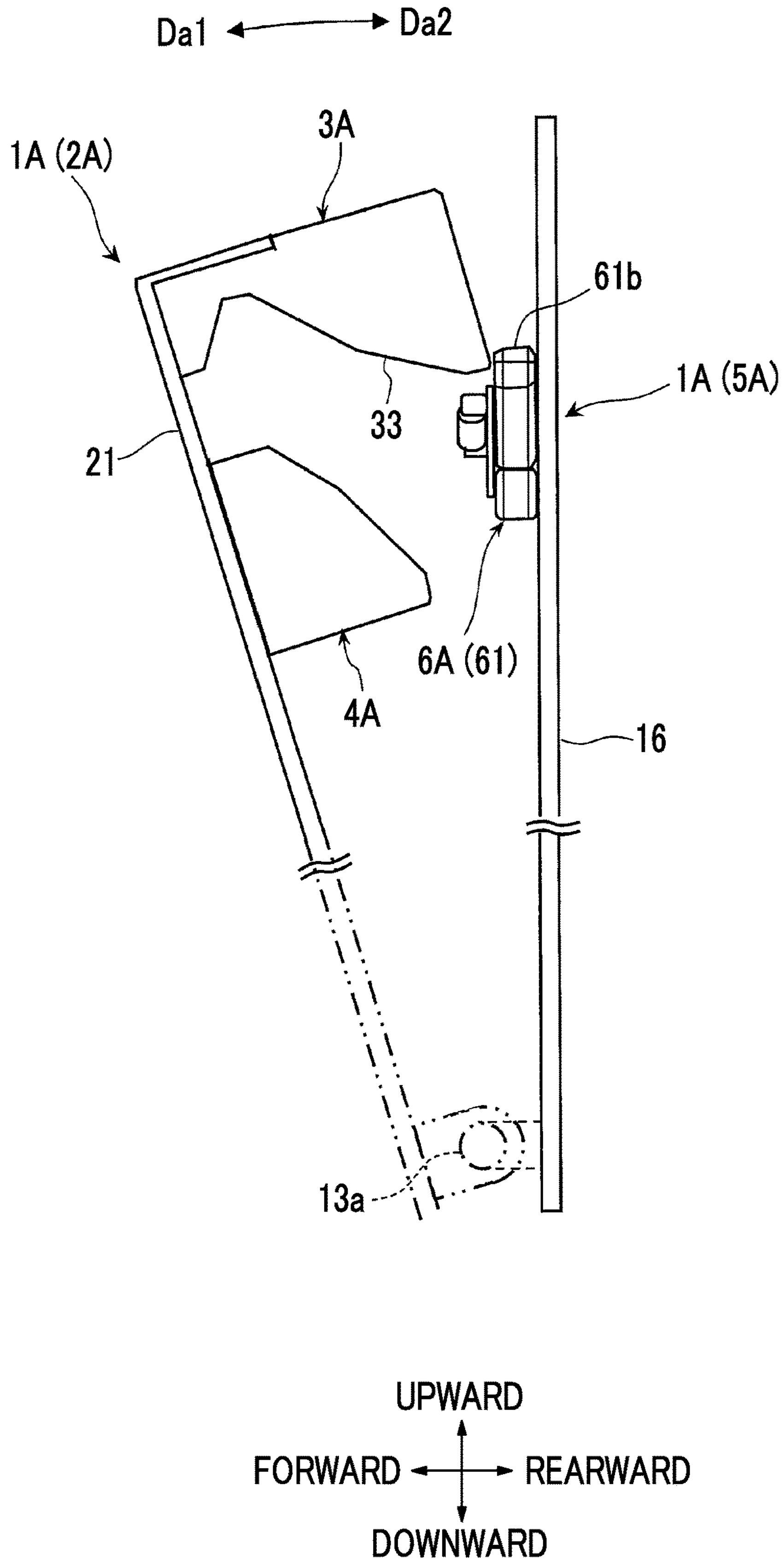
Figure 12:
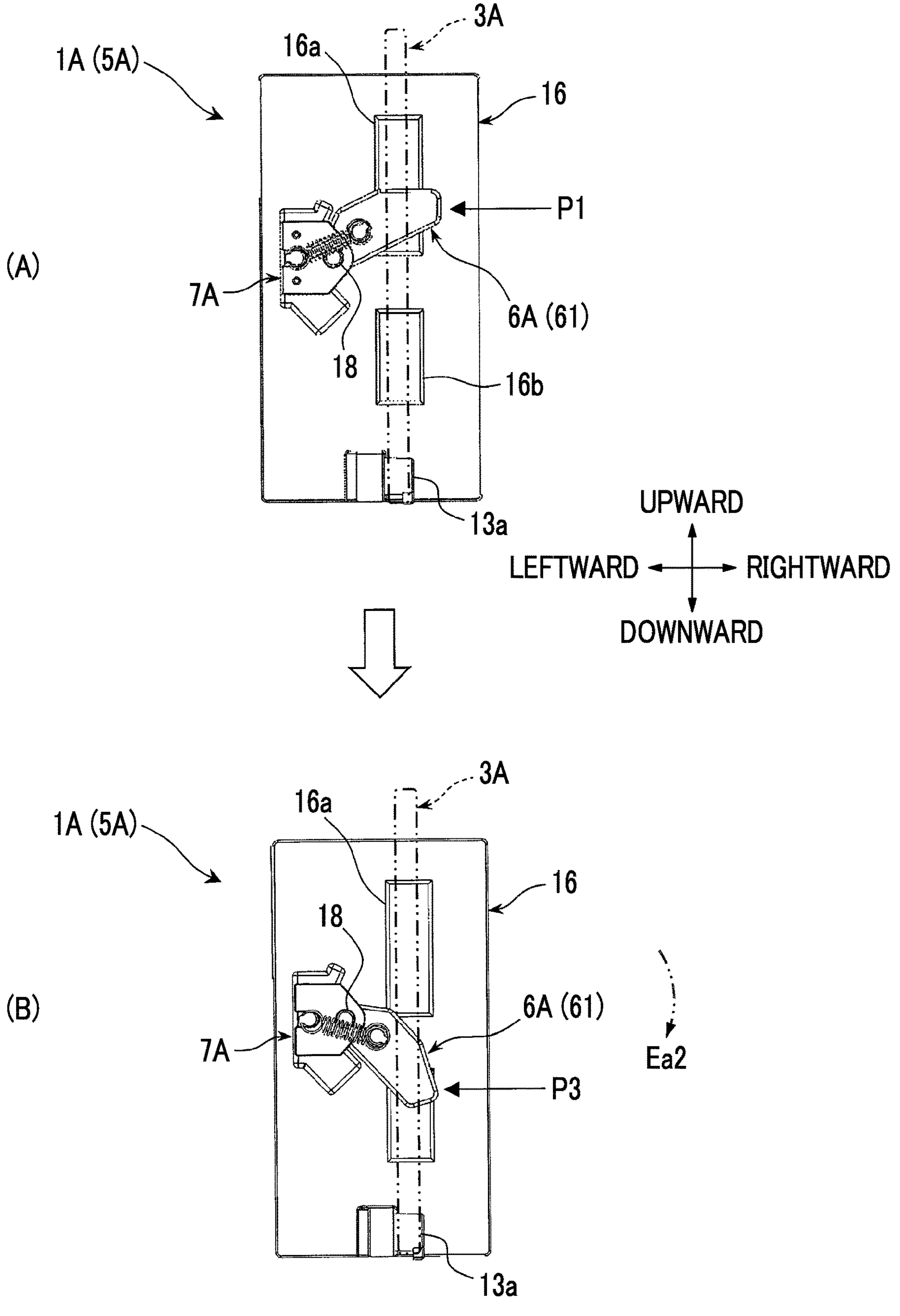
Figure 13:
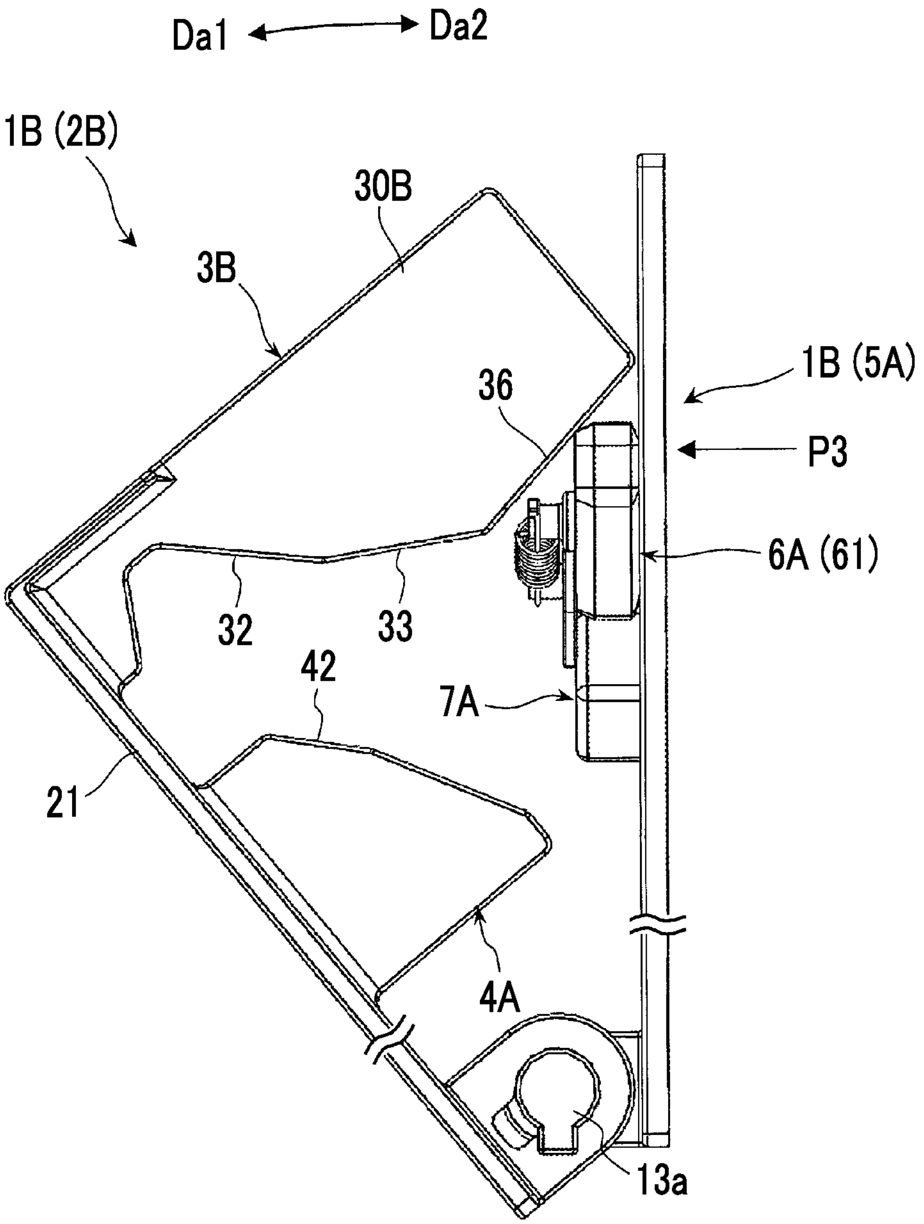
Figure 14:
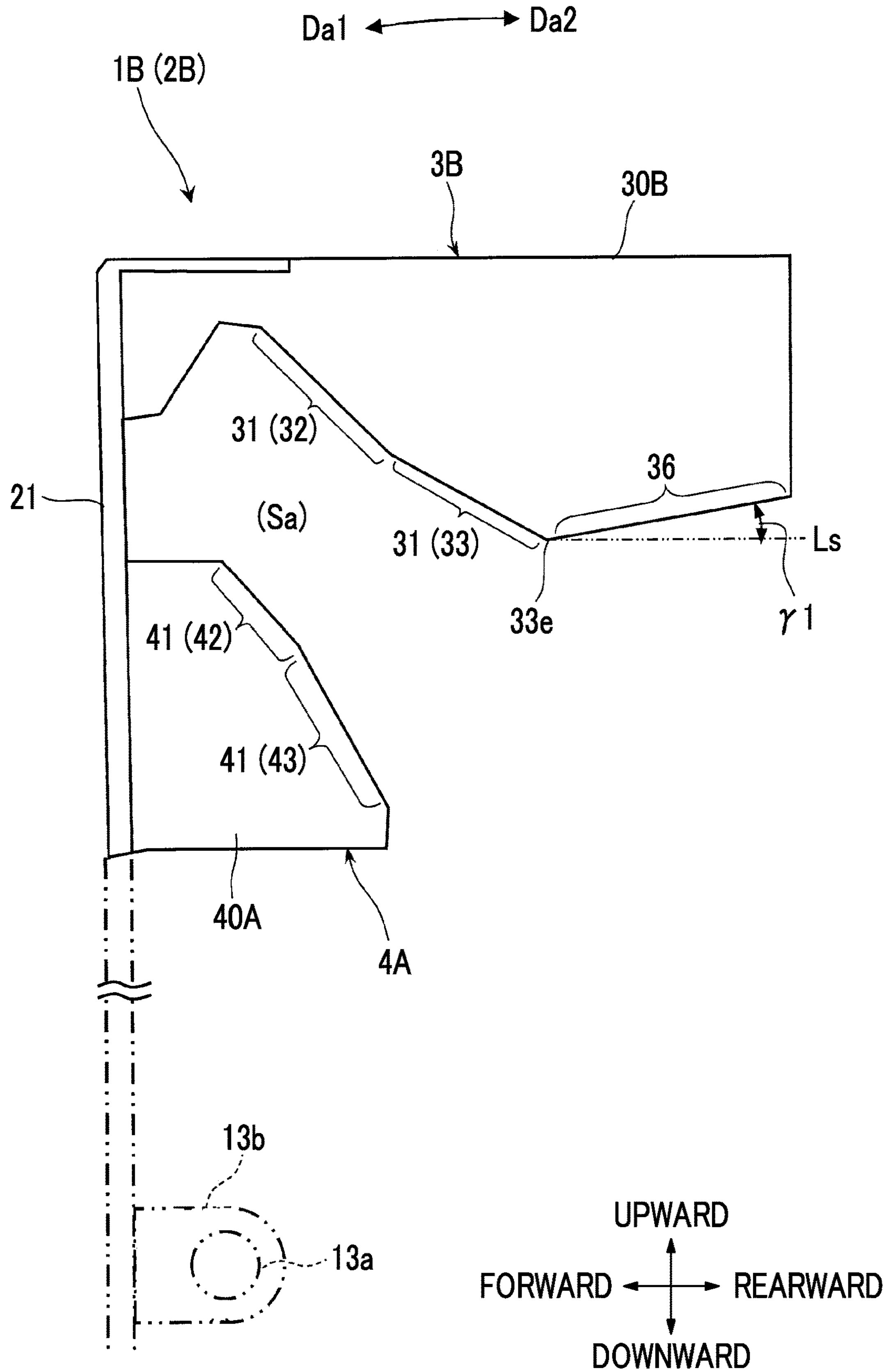
Figure 15A:
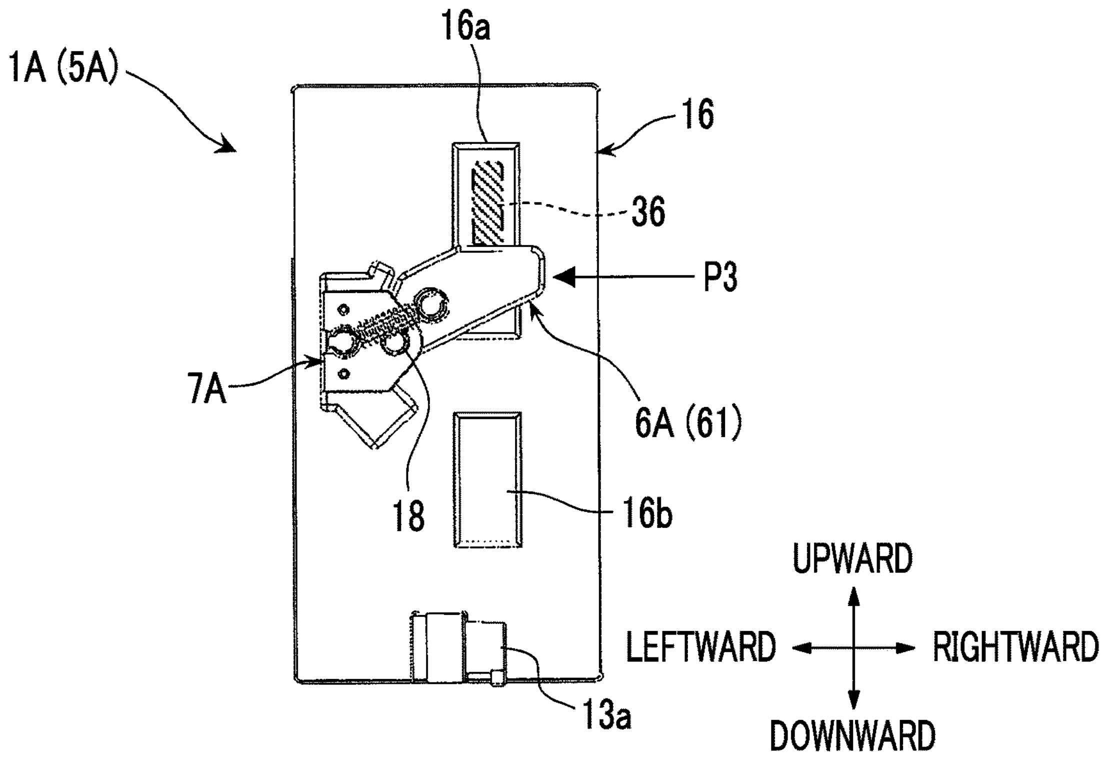
Figure 15B:
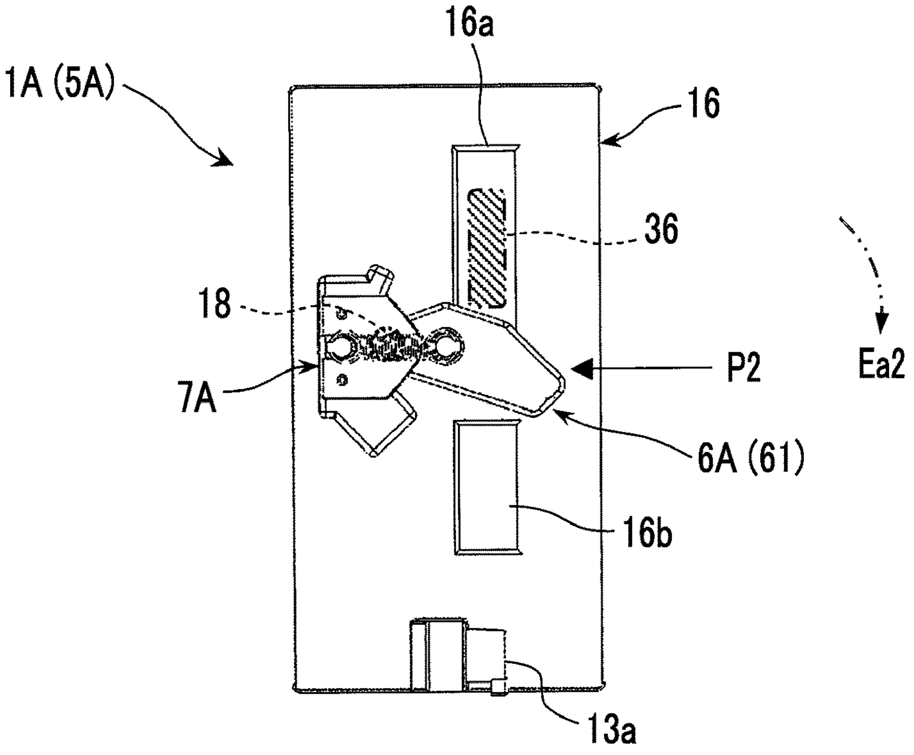
Figure 16A:
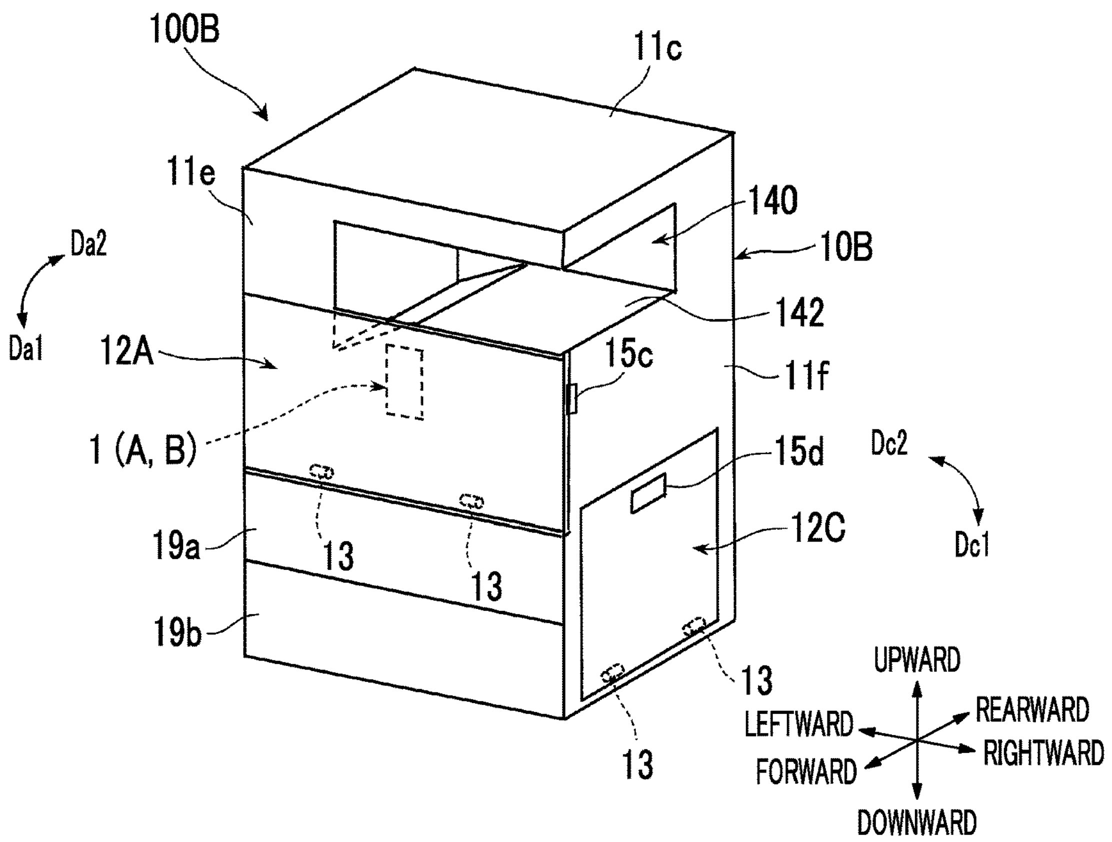
Figure 16B:
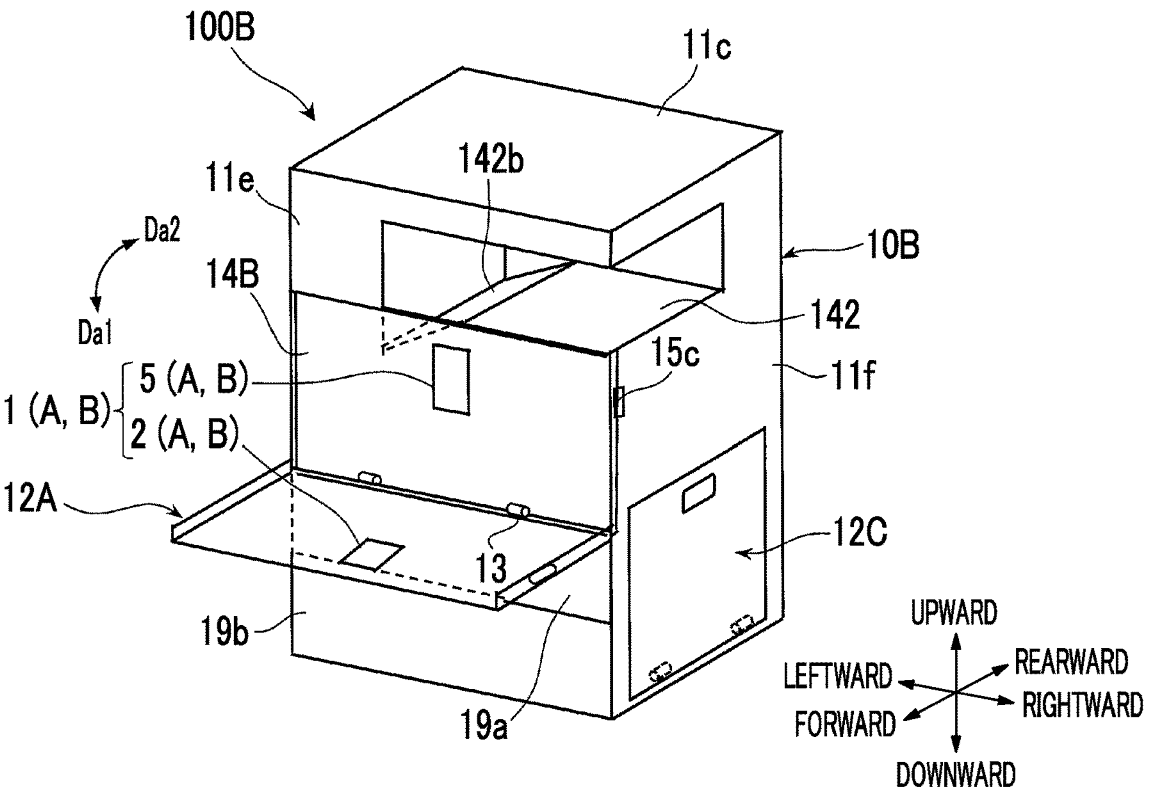
Figure 17:
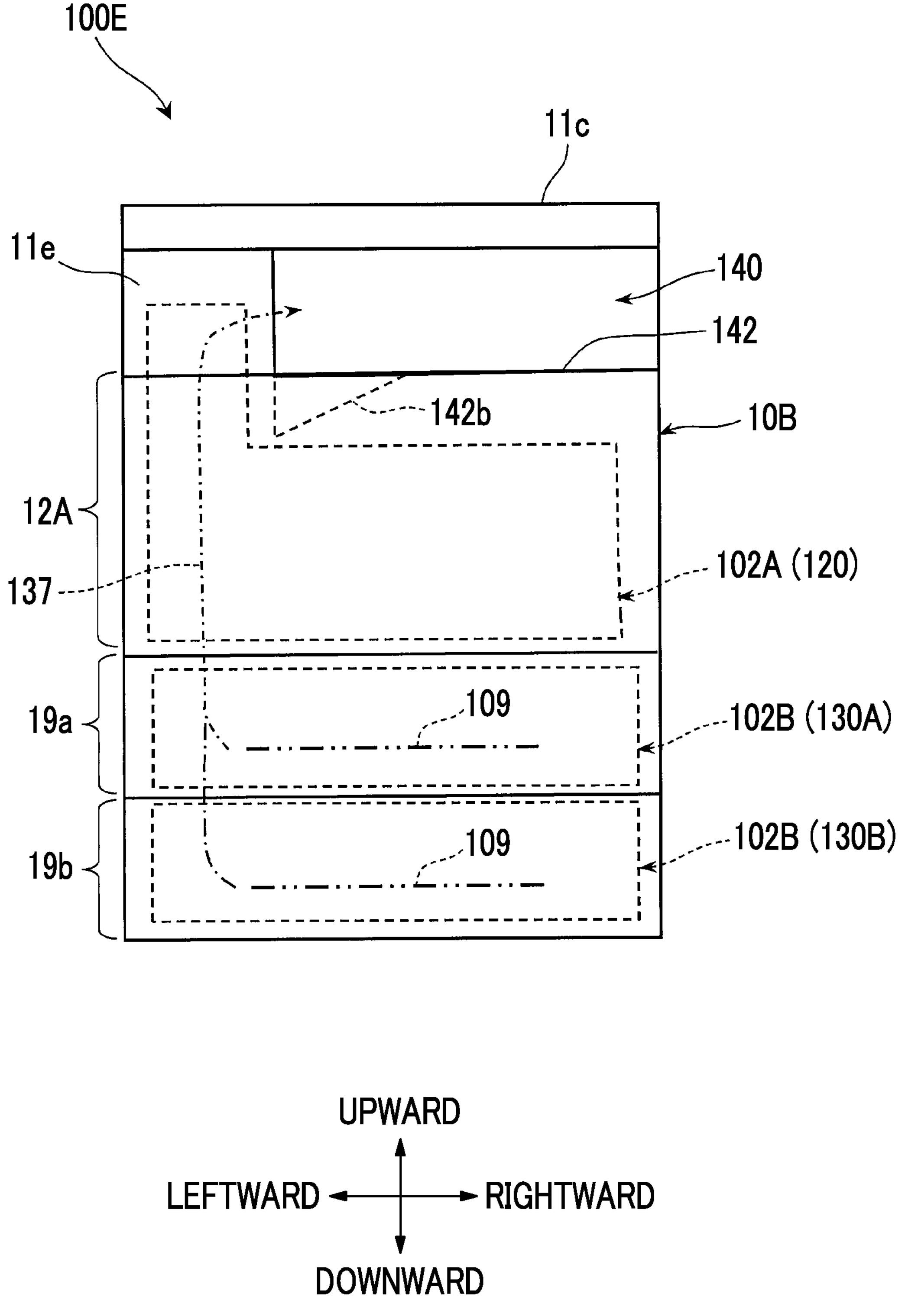

A part (A) in FIG. 7 is a front view of the swing portion when the opening/closing cover is opened, a part (B) in FIG. 7 is a front view of the swing portion while the opening/closing cover is opened/closed, and a part (C) in FIG. 7 is a front view of the swing portion when the opening/closing cover is closed;

FIG. 8A is a right side view when engagement of the opening/closing mechanism starts or ends, and FIG. 8B is a front view of the swing portion including a cross section taken along line B-B of the first inclined portion and the second inclined portion in FIG. 8A;

FIG. 9A is a right side view during engagement of the opening/closing mechanism, and FIG. 9B is a front view of the swing portion including a cross section taken along line B-B of the first inclined portion and the second inclined portion in FIG. 9A;

FIG. 10A is a right side view when engagement of the opening/closing mechanism is completed, and FIG. 10B is a front view of the swing portion including a cross section taken along line B-B of the first inclined portion and the second inclined portion in FIG. 10A;

FIG. 11 is a schematic view of the opening/closing mechanism in which the swing portion is abnormal when the opening/closing cover is closed;

A part (A) in FIG. 12 is a front view of the swing portion in an abnormal state in FIG. 11, and a part (B) in FIG. 12 is a schematic view of the swing portion after the swing portion in the abnormal state in the part (A) in FIG. 12 is manually dealt with;

FIG. 13 is a side view of an opening/closing mechanism according to a second exemplary embodiment;

FIG. 14 is a schematic side view of a first structural body in the opening/closing mechanism in FIG. 13;

FIG. 15A is a schematic front view when an opening/closing cover of the opening/closing mechanism in FIG. 13 is closed, and FIG. 15B is a schematic front view when abnormality of the opening/closing mechanism in FIG. 13 released;

FIG. 16A is a perspective view showing a closed state of an opening/closing cover of a device including an opening/closing mechanism according to a third exemplary embodiment, and FIG. 16B is a perspective view showing an opened state of the opening/closing cover of the device shown in FIG. 16A; and FIG. 17 is a schematic front view of the device shown in FIGS. 16A and 16B;

DETAILED DESCRIPTION

Hereinafter, exemplary embodiments for the present disclosure will be described with reference to the drawings.

First Exemplary Embodiment

Figure 1A:
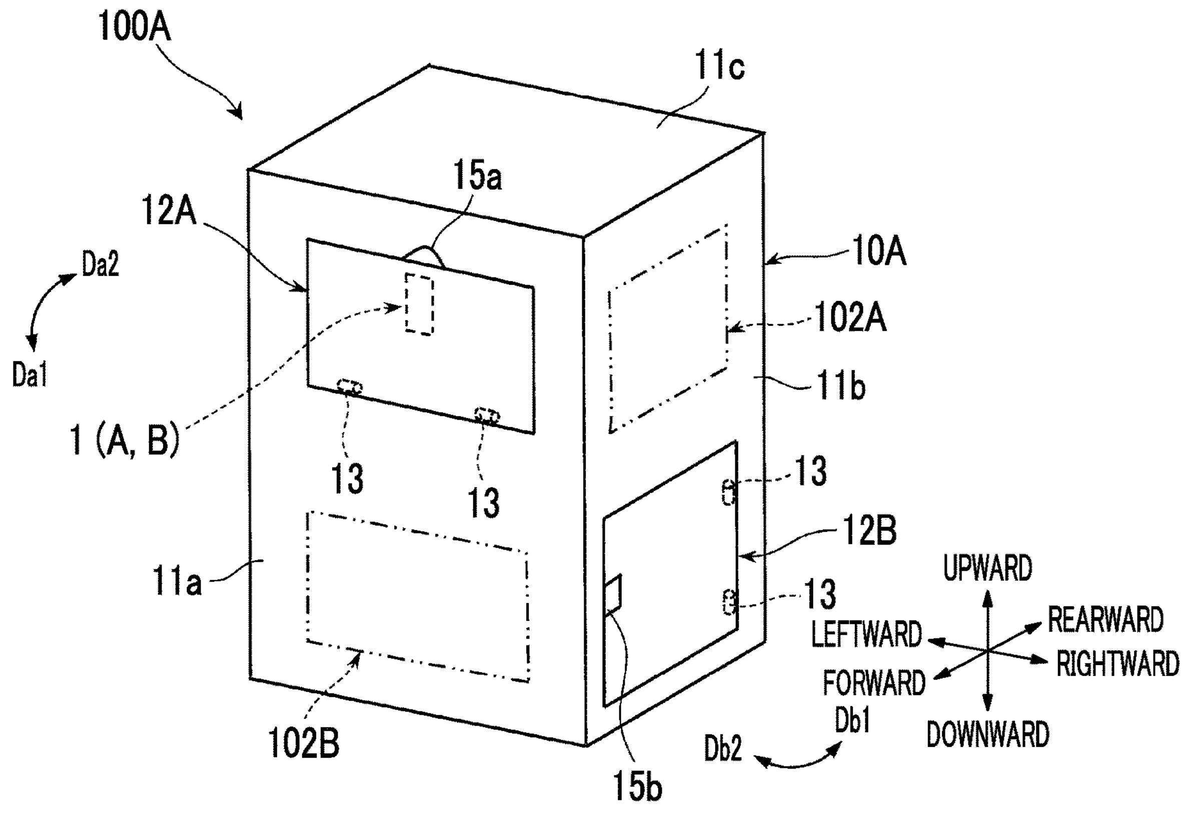
FIG. 1A is a perspective view showing a closed state of an opening/closing cover of a device including an opening/closing mechanism according to a first exemplary embodiment.
Figure 1B:
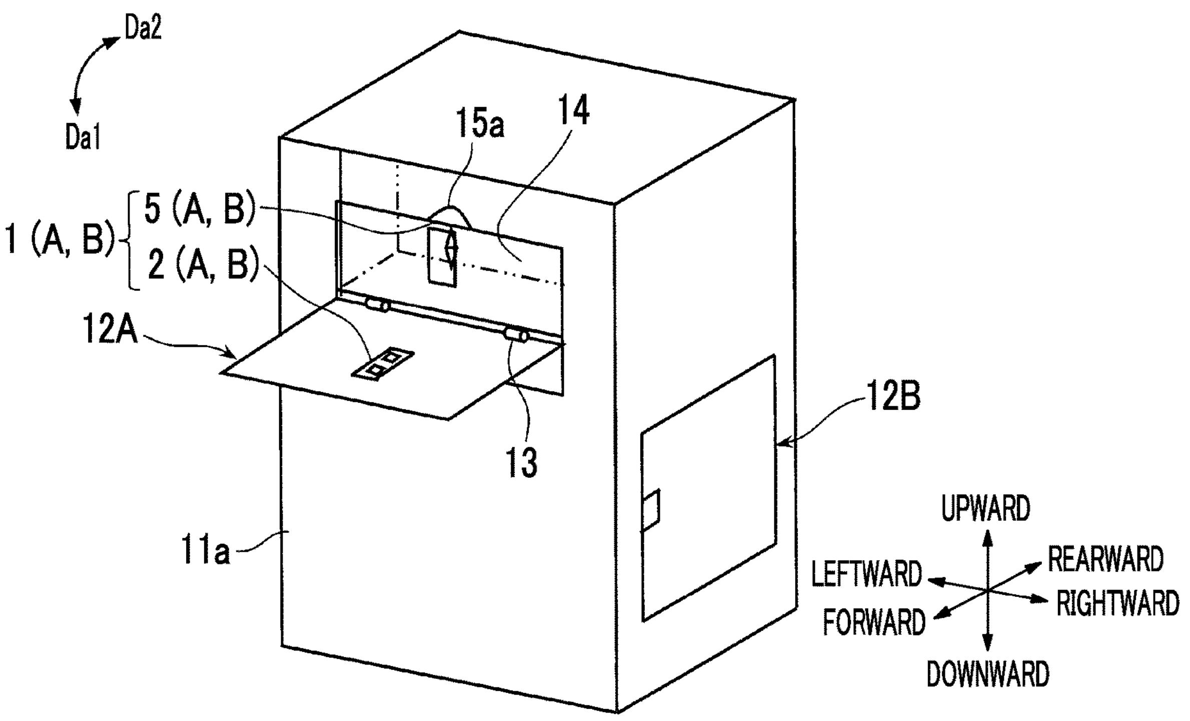
FIG. 1B is a perspective view showing an opened state of the opening/closing cover of the device shown in FIG. 1A.
Figure 2:
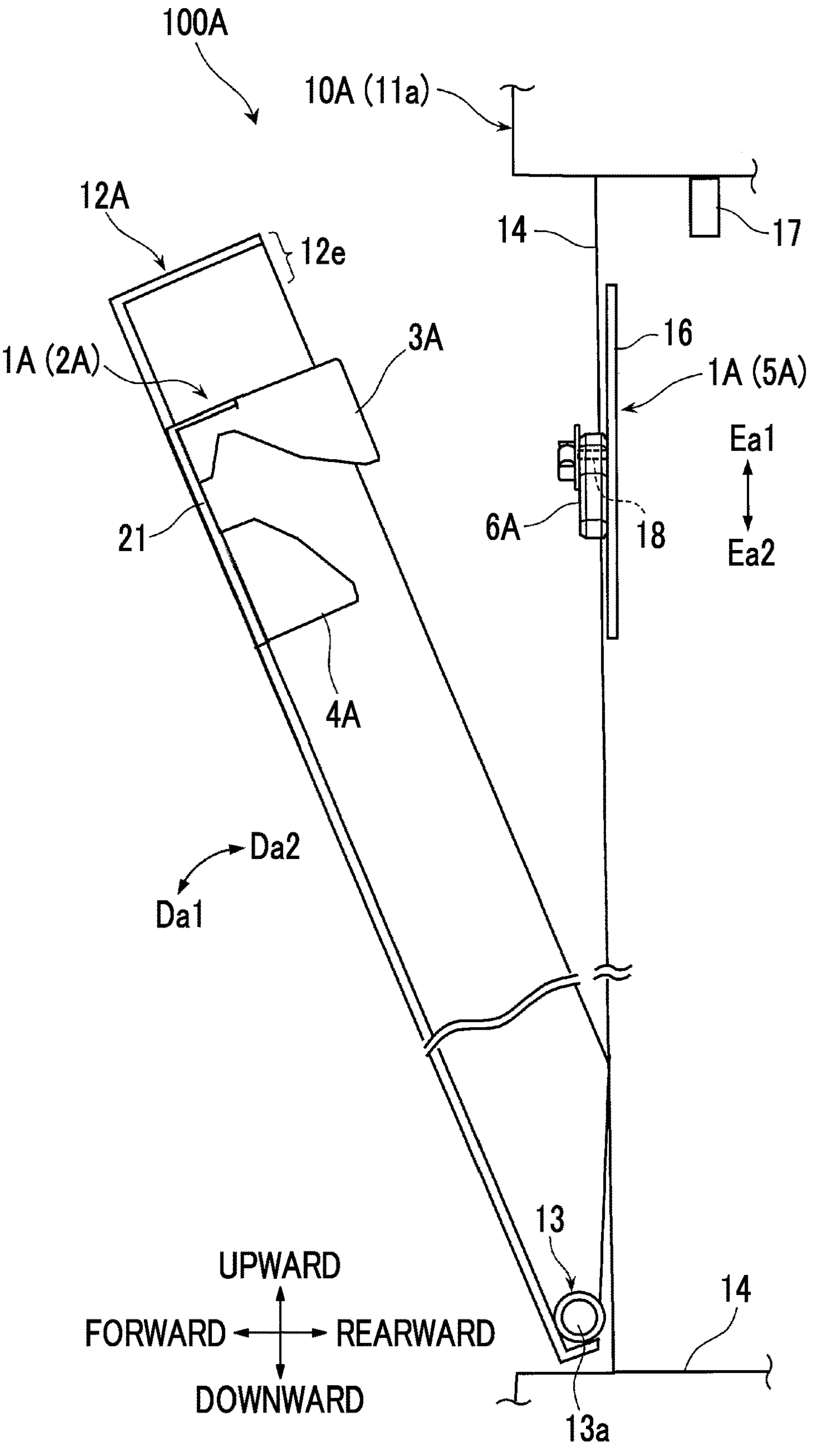
FIG. 2 is a schematic sectional view of an opened portion of the opening/closing cover of the device shown in FIGS. 1A and 1B.
Figure 3:
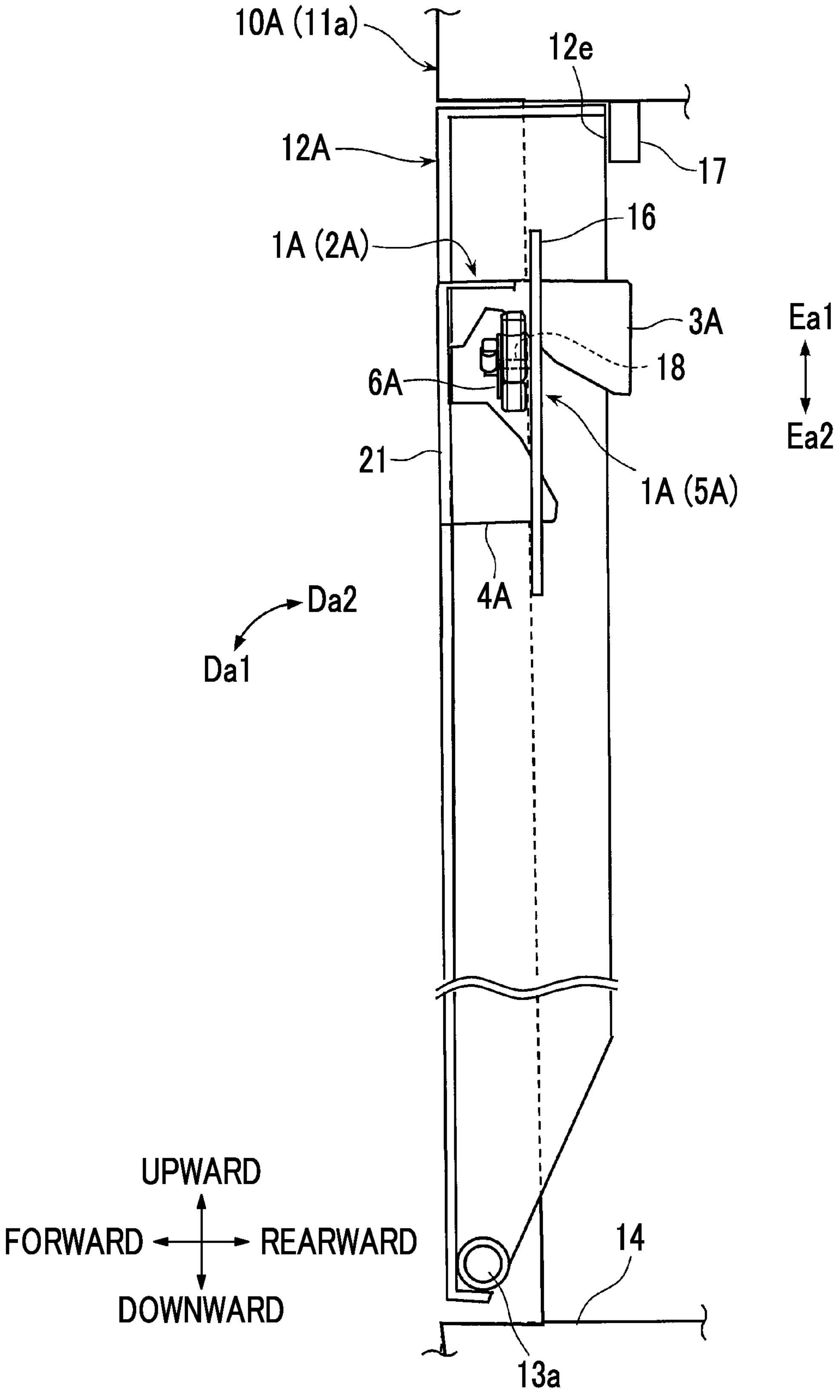
FIG. 3 is a schematic sectional view of a closed portion of the opening/closing cover of the device shown in FIGS. 1A and 1B.
Figure 4A:
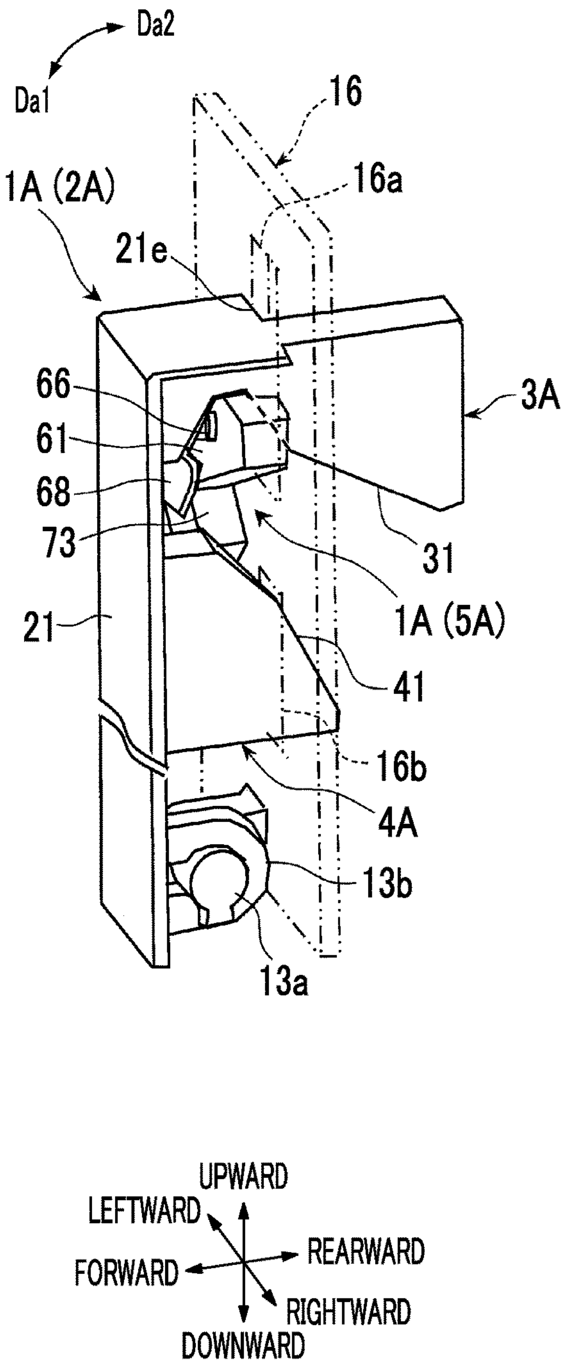
FIG. 4A is a perspective view of an obliquely right side of the opening/closing mechanism.
Figure 4B:
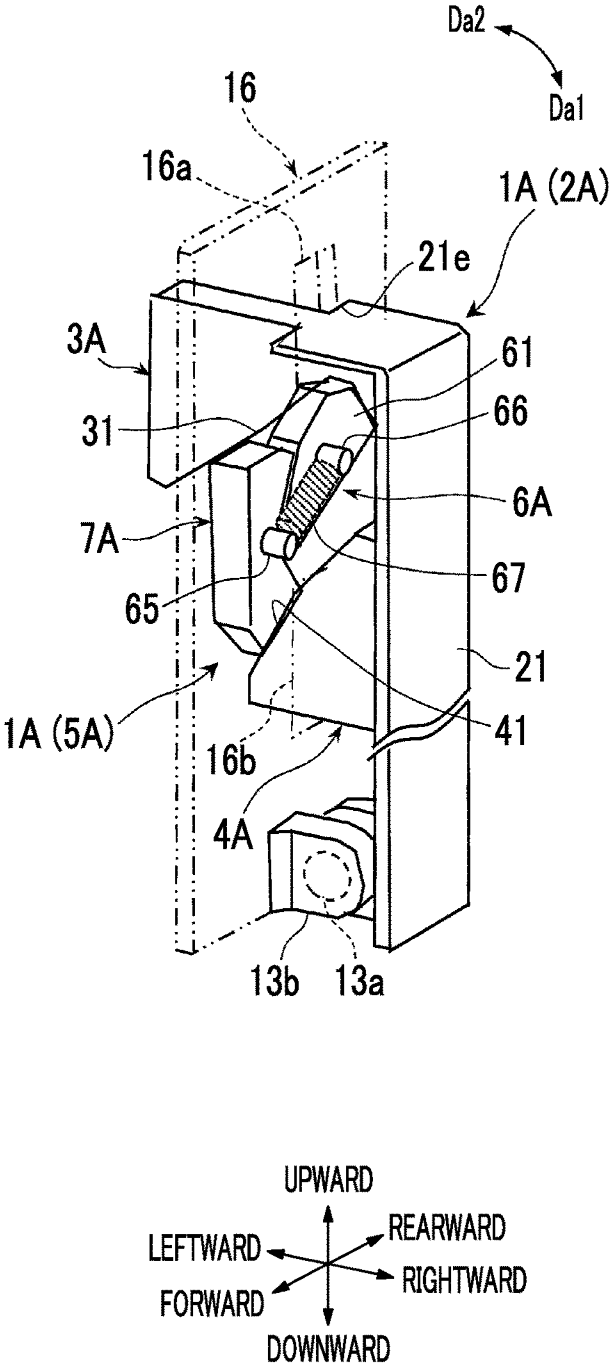
FIG. 4B is a perspective view of an obliquely left side of an opening/closing device.

FIGS. 1A and 1B are perspective views conceptually showing each state of a device 100A including an opening/closing mechanism 1A according to a first exemplary embodiment of the present disclosure. FIG. 2 is a schematic sectional view of an opened portion of an opening/closing cover of the device 100A. FIG. 3 is a schematic sectional view of a closed portion of the opening/closing cover of the device 100A. FIGS. 4A and 4B are perspective views of the opening/closing mechanism 1A adopted in the device 100A.

Device Including Opening/Closing Mechanism

As shown in FIGS. 1A and 1B, the device 100A including the opening/closing mechanism 1A includes a housing 10A which is an example of a main body.

The housing 10A is configured to have a required outer shape, and an outside thereof is covered with an exterior cover 11. In addition, a plurality of functional units 102A and 102B for achieving required functions of the device 100A are disposed inside the housing 10A. The functional units 102A and 102B are not limited to an image forming unit or a medium supply unit to be described later as an example, and include a portion having any function in other various fields. Therefore, the device 100A can be configured to serve as any type of the device.

In addition, as shown in FIGS. 1A and 1B, the device 100A is configured to serve as opening/closing covers 12A and 12B which are examples of opening/closing bodies in which a portion of the exterior cover 11 is opened/closed to cover and expose a portion of the device 100A. The device 100A may include an opening/closing cover other than the opening/closing covers 12A and 12B.

For example, the opening/closing cover 12A is a rectangular cover that constitutes a portion of the exterior cover 11*a* disposed on a front side of the device 100A.

As shown in FIGS. 2 to 5, the opening/closing cover 12A is a so-called vertical opening type of the opening/closing cover whose lower end portion is supported by a hinge 13 to be openable/closable, and which is opened/closed by rotating at a predetermined angle in directions Da1 and Da2 indicated by arrows while a support shaft 13*a* of the hinge 13 serves as a fulcrum.

The support shaft 13*a* is an example of a first shaft, and is a long shaft in a direction orthogonal to the opening/closing directions Da1 and Da2 of the opening/closing cover 12A. The support shaft 13*a* in the first exemplary embodiment is a long columnar shaft in the direction laterally orthogonal to the opening/closing directions Da1 and Da2 of the opening/closing cover 12A.

A reference numeral 14 shown in FIG. 1B indicates an opening/closing portion when opened/closed by the opening/closing cover 12A in the main body 10A. In addition, in the first exemplary embodiment, the support shaft 13*a* of the hinge 13 is provided in a portion (opening/closing portion 14) of the main body 10A, and a bearing portion 13*b* of the hinge 13 is provided in the opening/closing cover 12A.

For example, the opening/closing cover 12B is a rectangular cover that constitutes a portion of the exterior cover 11*b* disposed on a right side surface of the device 100A.

The opening/closing cover 12B is a so-called horizontal opening type opening/closing cover whose front side end portion is supported by the hinge 13 to be openable/closable, and which is opened/closed by rotating around the shaft of the hinge 13 at a predetermined angle in directions indicated by arrows Db1 and Db2.

Reference numerals 15*a* and 15*b* shown in FIGS. 1A and 1B indicate recessed portions or handle portions for guiding an operator's hand to the handle portions in a case where the opening/closing cover 12A and the opening/closing cover 12B are respectively opened.

Furthermore, the device 100A is provided with the opening/closing mechanism 1A (to be described later) engaging (hooking) with one (single) opening/closing cover 12A when closed.

The remaining opening/closing cover 12B or other opening/closing covers (not shown) are provided with the opening/closing mechanism having a configuration different from a configuration of the opening/closing mechanism 1A or the opening/closing mechanism, but the opening/closing mechanism 1A may be provided in the same manner.

Opening/Closing Mechanism

As shown in FIGS. 1A to 3, the opening/closing mechanism 1A includes a first structural body 2A having a first inclined portion 3A and a second inclined portion 4A which are disposed in the opening/closing cover 12A, and a second structural body 5A having a swing portion 6A disposed in the main body 10A and engaging with the first structural body 2A when the opening/closing cover 12A is closed.

The first structural body 2A is attached to a required position on a back surface (rear surface) of the opening/closing cover 12A. In the first structural body 2A in the first exemplary embodiment, the first inclined portion 3A and the second inclined portion 4A are disposed at positions which can come into contact and engage with the swing portion 6A of the second structural body 5A when the opening/closing cover 12A is closed.

In addition, for example, the second structural body 5A is attached to an attachment frame 16 disposed at a required position of the opening/closing portion 14 of the main body 10A. The second structural body 5A in the first exemplary embodiment is disposed at a position substantially in a right and left center of the opening/closing portion 14 and on an upper side thereof.

As shown in FIGS. 2 to 5, the first structural body 2A is configured to serve as a structural body in which the support portion 21 is provided with the first inclined portion 3A and the second inclined portion 4A.

The first inclined portion 3A and the second inclined portion 4A in the first structural body 2A integrally move in response to an opening/closing operation (operation in which the support shaft 13*a* which is an example of the first shaft serves as a fulcrum) along the opening/closing directions Da1 and Da2 indicated by the arrows of the opening/closing cover 12A.

The first inclined portion 3A and the second inclined portion 4A are portions in which inclined portions 31 and 41 (to be described later) are respectively formed in protruding portions 30A and 40A respectively protruding at vertically separated positions of the support portion 21.

In addition, the first inclined portion 3A and the second inclined portion 4A are disposed so that the second inclined portion 4A exists closer to the support shaft 13*a* than the first inclined portion 3A. In other words, in a case of the first exemplary embodiment, the second inclined portion 4A is disposed to exist on a lower side in a vertical direction with respect to the first inclined portion 3A.

The support portion 21 is a portion that supports the first inclined portion 3A and the second inclined portion 4A. The support portion 21 in the first exemplary embodiment is configured to serve as a plate-shaped portion having a longitudinally long rectangular shape and whose upper portion is bent to one side. A shape of the support portion 21 may be any shape as long as the support portion 21 can support the first inclined portion 3A and the second inclined portion 4A, and is not particularly limited.

The support portion 21 is attached and fixed to a predetermined attachment position on a back surface of the opening/closing cover 12A.

The protruding portions 30A and 40A are portions respectively protruding from one surface of the support portion 21 toward a downstream side of the opening/closing cover 12A in the closing direction Da2. Both the protruding portions 30A and 40A in the first exemplary embodiment have a plate-shaped form having a required thickness.

The first inclined portion 3A has a portion 31 existing on a side (lower side portion) facing the support shaft 13*a* in the protruding portion 30A and inclined obliquely downward at a required inclination angle α.

The second inclined portion 4A has a portion 41 separated to a side closer to the support shaft 13*a* from the first inclined portion 3A in the plate-shaped protruding portion 40A, existing on a side (upper side portion) facing the first inclined portion 3A, and inclined obliquely downward at a required inclination angle β.

Figure 5:
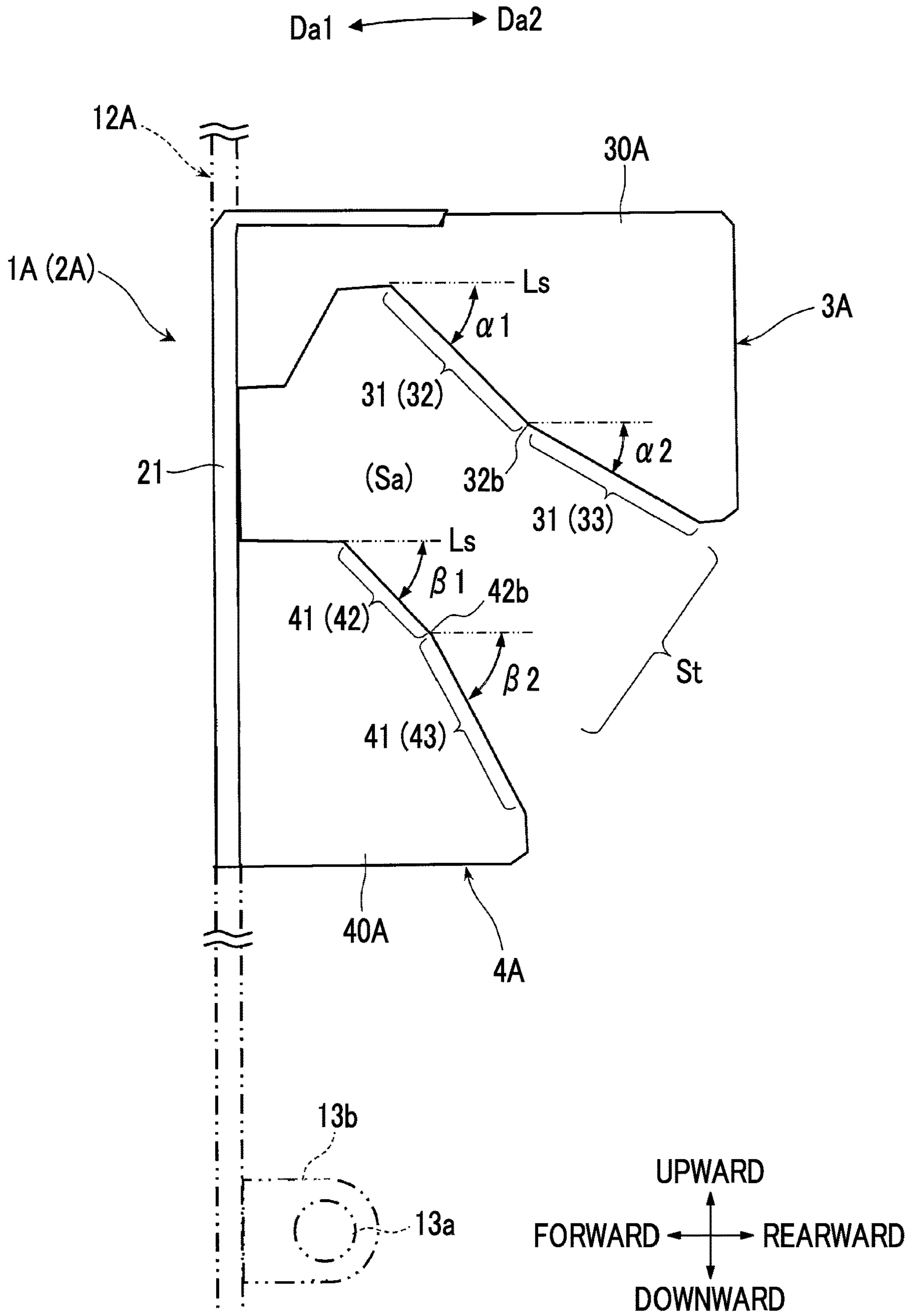
FIG. 5 is a right side view of a first structural body having a first inclined portion and a second inclined portion.

As shown in FIG. 5, both the inclination angles α and β are smaller angles in angles formed with respect to a reference line Ls in a case where a straight line substantially along the closing direction Da2 (or a horizontal direction in a case where the opening/closing cover 12A is closed) of the opening/closing cover 12A is defined as the reference line Ls.

In addition, as shown in FIGS. 5, 8A, and 8B, the inclined portion 31 and the inclined portion 41 are formed in a state where an interval St required for securing a swingable gap space Sa which the swing portion 6A in the second structural body 5A can enter during the opening/closing operation of the opening/closing cover 12A. Furthermore, the inclined portion 31 and the inclined portion 41 have corner portions in contact with (the swing body 61 of) the swing portion 6A as a tapered surface so that contact movement is smoothly achieved after the contact.

On the other hand, as shown in FIGS. 2 to 4B, 6A, and 6B, the second structural body 5A is configured to serve as a structural body in which the swing portion 6A and a swing restricting portion 7A are provided in the attachment frame 16 in the opening/closing portion 14 of the main body 10A.

The attachment frame 16 is provided with a first opening portion 16*a* through which a portion of a protruding tip side of the first inclined portion 3A is allowed to pass and escape, and second opening portion 16*b* through which a portion of a protruding tip side of the second inclined portion 4A is allowed to pass and escape, when the opening/closing cover 12A is closed.

Incidentally, the second structural body 5A can also adopt a dedicated support body instead of the attachment frame 16. In a case where the dedicated support body is adopted, for example, the dedicated support body may be finally attached to the attachment frame 16.

As shown in FIGS. 6A to 10B, the swing portion 6A in the second structural body 5A has a portion swinging to be capable of coming into contact with the first inclined portion 3A and the second inclined portion 4A between the first inclined portion 3A and the second inclined portion 4A while a swing shaft 18 which is an example of a second shaft provided in the attachment frame 16 of the main body 10A serves as the fulcrum.

As shown in FIGS. 8A to 10B, the swing portion 6A is a portion which applies a force Fb in the closing direction Da2 of the opening/closing cover 12A by coming into contact with the first inclined portion 3A after applying a force Fa in the opening direction Da1 of the opening/closing cover 12A by coming into contact with the second inclined portion 4A during the closing operation of the opening/closing cover 12A.

Details of applying the respective forces Fa and Fb in this case will be described later.

As shown in FIGS. 4A, 6A, 6B, and 7, the swing portion 6A in the first exemplary embodiment is configured to serve as a structural body including a swing body 61, a first attachment portion 65, a second attachment portion 66, and a tension applying member 67.

Figure 6A:
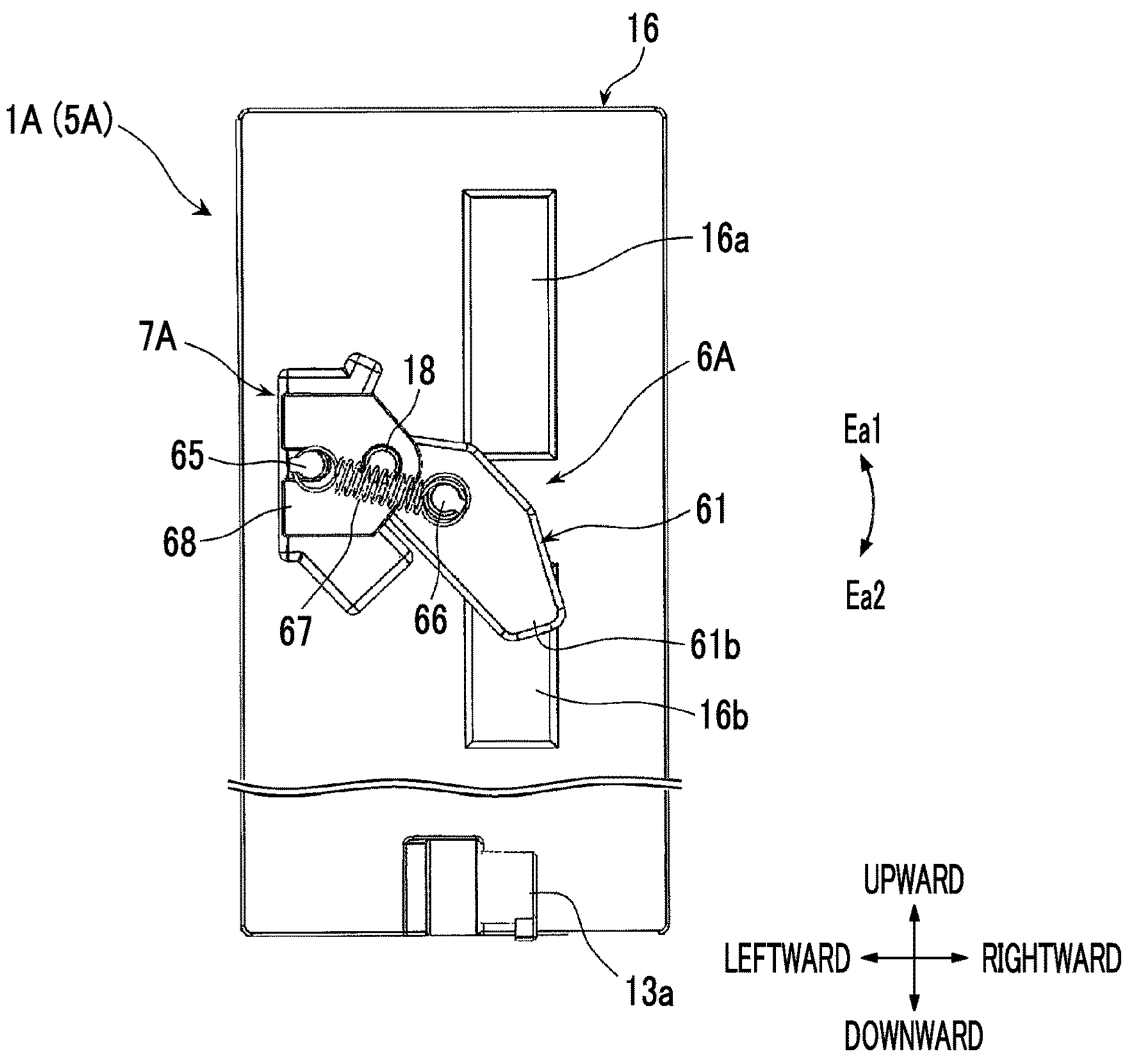
FIG. 6A is a front view of a second structural body having a swing portion of the opening/closing mechanism.
Figure 6B:
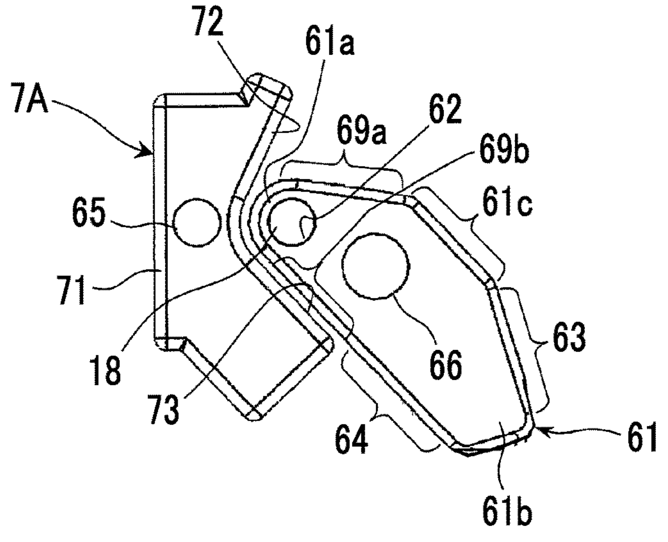
FIG. 6B is an enlarged view of the swing portion.

As shown in FIGS. 6A and 6B, the swing body 61 is configured to serve as a plate-shaped member thinly extending in one direction with a required thickness. In addition, as shown in FIG. 8A, the swing shaft 18 which is an example of the second shaft that supports the swing body 61 to be swingable is a long shaft in a direction orthogonal to the support shaft 13*a*. In addition, specifically, the swing shaft 18 is a shaft extending long substantially along the closing direction Da2 of the opening/closing cover 12A. The swing shaft 18 in the first exemplary embodiment is formed as a columnar protrusion protruding along a forward direction on a front surface of the attachment frame 16.

As shown in FIGS. 6A and 6B, the swing body 61 swings so that the other end portion 61*b* moves in an upward direction Ea1 or in a downward direction Ea2 while the swing shaft 18 in one end portion 61*a* in a longitudinal direction serves as the fulcrum.

In addition, as shown in FIG. 6B, the swing body 61 has a shape having a bearing portion 62 provided so that the swing shaft 18 is fitted into one end portion 61*a* in the longitudinal direction to be pivotable, a first contact surface 63 provided in an upper portion (upper side portion) facing the other end portion 61*b* from the one end portion 61*a*, and coming into contact with the first inclined portion 3A, and a second contact surface 64 provided in a lower portion (lower side portion) facing the other end portion 61*b* from the one end portion 61*a*, and coming into contact with the second inclined portion 4A.

The first contact surface 63 is formed with a required length in a portion biased to the other end portion 61*b* side in the upper side portion of the swing body 61. In addition, as shown in a part (C) in FIG. 7 and FIG. 10B, the first contact surface 63 is formed as a closing holding surface in which the swing body 61 when the opening/closing cover 12A is located at a closing completion position holds the first inclined portion 3A by coming into contact with the first inclined portion 3A in the first structural body 2A in a substantially horizontal state.

In addition, as shown in FIG. 6B, a contact avoiding surface 61*c* that escapes not to come into contact with the first inclined portion 3A when the swing body 61 swings is formed in a portion continuous to one end portion 61*a* side from one end of the first contact surface 63 in the upper side portion of the swing body 61. In addition, as shown in FIG. 6B, a swing restricting upper surface 69*a* that comes into contact with a first stop portion 72 (to be described later) of the swing restricting portion 7A is formed in a portion reaching one end portion 61*a* from one end of the contact avoiding surface 61*c* in the upper side portion of the swing body 61.

The second contact surface 64 is formed with a required length in a portion biased to the other end portion 61*b* side in the lower side portion of the swing body 61. The second contact surface 64 is configured to include a flat surface extending to be substantially linearly continuous to the other end portion 61*b* from one end portion 61*a* of the swing body 61 together with a swing restricting lower surface 69*b* (to be described later).

In addition, as shown in FIG. 6B, the swing restricting lower surface 69*b* that comes into contact with the first stop portion 72 (to be described later) of the swing restricting portion 7A is formed in a portion reaching the one end portion 61*a* from one end of the second contact surface 64 in the lower side portion of the swing body 61.

Furthermore, the swing body 61 has a corner portion in contact with the first inclined portion 3A and the second inclined portion 4A as a tapered surface so that contact swing is smoothly achieved after the contact.

A reference numeral 68 in FIG. 6A is a side surface plate attached between one end portion 61*a* of the swing body 61 and a portion of the swing restricting portion 7A. The side surface plate 68 is attached to the lower side of the tension applying member 67 while the swing shaft 18 and the first attachment portion 65 serve as a reference for an attachment position, and support the tension applying member 67 to have a stable behavior when the swing body 61 swings.

The first attachment portion 65 is a portion for attaching one end of the tension applying member 67. The first attachment portion 65 is provided in the attachment frame 16 on the main body 10A side. In the first exemplary embodiment, the first attachment portion 65 is provided as a columnar protrusion protruding in the forward direction in the swing restricting portion 7A (to be described later) disposed in the attachment frame 16.

The second attachment portion 66 is a portion for attaching the other end of the tension applying member 67. The second attachment portion 66 is provided at a position on a side opposite to the first attachment portion 65 across the swing shaft 18 of the swing portion 6A. In the first exemplary embodiment, the second attachment portion 66 is provided as a columnar protrusion protruding in the forward direction from the center in the longitudinal direction of the swing body 61 at a position closer to one end portion 61*a*.

The tension applying member 67 is a member attached to apply tension between the first attachment portion 65 and the second attachment portion 66. In the first exemplary embodiment, a coil spring for tension is adopted as the tension applying member 67. In the coil spring which is an example of the tension applying member 67, one end is attached to the first attachment portion 65, and the other end is attached to the second attachment portion 66. In this manner, the coil spring of the tension applying member 67 holds a state where the first attachment portion 65 and the second attachment portion 66 are pulled as a whole, and applies a required pulling force between both of these.

The swing restricting portion 7A in the second structural body 5A is a portion that restricts a swing range by stopping movement when the swing body 61 of the swing portion 6A swings at a predetermined position.

As shown in FIGS. 6A and 6B, the swing restricting portion 7A is configured to serve as a structural portion in which the first stop portion 72 and the second stop portion 73 are provided in a main body portion 71 disposed in the attachment frame 16 of the main body 10A.

The main body portion 71 is disposed as a portion having a shape raised in the forward direction at a position close to one end portion 61*a* where the bearing portion 62 of the swing body 61 is located in the attachment frame 16. In the main body portion 71, the first attachment portion 65 is provided as a columnar protrusion protruding in the forward direction.

The first stop portion 72 is a portion that comes into contact with the swing body 61 of the swing portion 6A when swinging to the first inclined portion 3A side, and stops the swing at that time. The second stop portion 73 is a portion that comes into contact with the swing body 61 of the swing portion 6A when swinging to the second inclined portion 4A side, and stops the swing at that time.

The first stop portion 72 and the second stop portion 73 in the first exemplary embodiment are provided as wall surfaces at position for restricting both ends of the swing range of the swing portion 6A on a surface facing the swing body 61 of the main body portion 71. In addition, the first stop portion 72 and the second stop portion 73 are formed as surfaces respectively extending at a predetermined angle in the obliquely upward-downward direction while an intermediate position of a straight line connecting the swing shaft 18 and the first attachment portion 65 serves as a reference (starting point). The above-described predetermined angle is set to align with both end positions of the swing range required by the swing portion 6A in view of contact between the first inclined portion 3A and the second inclined portion 4A.

As shown in a part (B) in FIG. 7 and FIG. 8B, the swing restricting upper surface 69*a* of the swing body 61 comes into contact with the first stop portion 72. As shown in FIG. 10B, the swing restricting lower surface 69*b* of the swing body 61 comes into contact with the second stop portion 73.

In the swing portion 6A, as shown in FIG. 7, the swing body 61 swings to reach an upper side swing position P3 (part (C) in FIG. 7) after passing through an intermediate swing position P2 (part (B) in FIG. 7) from a lower side swing position P1 (part (A) in FIG. 7) while the swing shaft 18 serves as the fulcrum. In addition, the swing portion 6A swings in the reverse direction in which the swing body 61 reaches the lower side swing position P1 via the intermediate swing position P2 from the upper side swing position P3.

The lower side swing position P1 is a position when coming into contact with the second stop portion 73 of the swing restricting portion 7A. The upper side swing position P3 is a position when coming into contact with the first stop portion 72 of the swing restricting portion 7A.

In this case, as shown in FIG. 7, the swing portion 6A swings in a state where tension T of the tension applying member 67 is applied to the second attachment portion 66 of the swing body 61.

Therefore, the swing portion 6A swings to positively face any one of the lower side swing position P1 and the upper side swing position P3 while the intermediate swing position P2 serves as a switching point or a neutral point.

At the intermediate swing position P2, as shown in a part (B) in FIG. 7, the first attachment portion 65 and the second attachment portion 66 are brought into a state of being aligned with a straight line (Lc) to pass through the swing shaft 18, and tension T3 applied from the tension applying member 67 is maximized. In contrast, forces are temporarily balanced, and the first attachment portion 65 and the second attachment portion 66 are brought into a neutral state.

In this manner, in the swing portion 6A, when the swing body 61 reaches the intermediate swing position P2, a force J for promoting the swing of the swing body 61 is temporarily brought into a substantially zero (J≈0) state.

In addition, in the swing portion 6A, the intermediate swing position P2 serves as a switching point. Accordingly, an external force is applied to the swing body 61 when the swing body 61 is located at the intermediate swing position P2, and the swing body 61 moves in any direction of the upward direction and the downward direction. In this manner, a trigger for the swing can be obtained. Since the trigger of the swing is obtained, in the swing portion 6A, the swing body 61 receives the tensions T1 and T2 of the tension applying member 67, and swings to either the lower side swing position P1 or the upper side swing position P3. The above-described external force is obtained by the contact between the first inclined portion 3A and the second inclined portion 4A.

In this case, when the swing body 61 swings to the lower side swing position P1 side, the swing body 61 receives the tension T1 from the tension applying member 67, and receives the tension T1 in a state where the tension T1 is converted into a force J1 swinging toward the lower side swing position P1. In addition, when the swing body 61 swings toward the upper side swing position P3, the swing body 61 receives the tension T2 from the tension applying member 67, and receives the tension T2 in a state where the tension T2 is converted into a force J2 swinging toward the upper side swing position P3.

Next, the description will be returned to the first inclined portion 3A and the second inclined portion 4A in the first structural body 2A.

As shown in FIG. 5, the inclined portion 31 in the first inclined portion 3A has a closing portion 32 with which the swing portion 6A is continuously in contact when swinging to the first inclined portion 3A side during the closing operation of the opening/closing cover 12A.

The closing portion 32 is provided on a side starting to incline obliquely downward (inclination start side) in the inclined portion 31. In other words, the closing portion 32 is provided as a portion existing on the upstream side in the closing direction Da2 of the opening/closing cover 12A from the other portion in the inclined portion 31.

In addition, as shown in FIG. 5, the closing portion 32 is a portion inclined obliquely downward at a predetermined inclination angle $\alpha 1$.

The inclination angle $\alpha 1$ in this case is set to an angle larger than an inclination angle (for example, $\alpha 2$) of the other portion (for example, a contact avoiding portion 33 (to be described later)) of the inclined portion 31.

In this manner, when the swing body 61 of the swing portion 6A comes into contact with the closing portion 32 (refer to FIGS. 10A and 10B), the swing body 61 is more likely to slide on the closing portion 32 than the other portion, and the swing body 61 is brought into a state where the swing body 61 is likely to swing toward the upper side swing position P3. As a result, the first inclined portion 3A in this case more strongly receives the force Fb from the swing portion 6A in the closing direction Da2 of the opening/closing cover 12A than the other portion.

In addition, the closing portion 32 is formed so that the swing body 61 of the swing portion 6A remains in contact when the opening/closing cover 12A is completely closed. In this manner, the swing portion 6A holds a state where the opening/closing cover 12A is closed while the swing body 61 is in contact with the closing portion 32.

Furthermore, the closing portion 32 also functions as a portion (push-back portion) which causes the swing body 61 of the swing portion 6A in contact with the closing portion 32 to start to swing toward the second inclined portion 4A side by being pushed down to return downward, as is clear referring back to FIGS. 10A to 9B when the opening/closing cover 12A starts to be opened.

In addition, as shown in FIG. 5, the inclined portion 31 in the first inclined portion 3A has the contact avoiding portion 33 continuous from the end portion (lower end) 32*b* of the closing portion 32.

The contact avoiding portion 33 is an inclined portion which does not come into contact with the swing body 61 of the swing portion 6A when the opening/closing cover 12A is opened/closed. In addition, the contact avoiding portion 33 is a portion inclined obliquely downward at a predetermined inclination angle $\alpha 2$. For example, the inclination angle $\alpha 2$ is set to an angle smaller than the inclination angle $\alpha 1$ of the closing portion 32 ($\alpha 2 < \alpha 1$).

On the other hand, as shown in FIG. 5, the inclined portion 41 in the second inclined portion 4A has an opening portion 42 with which the swing portion 6A starting to swing to the second inclined portion 4A side first comes into contact, during the opening operation of the opening/closing cover 12A.

As shown in FIG. 5, the opening portion 42 is provided on a side starting to be inclined obliquely downward (inclination start side) in the inclined portion 41. In other words, the opening portion 42 is provided as a portion existing on the upstream side in the closing direction Da2 of the opening/closing cover 12A from the other portion in the inclined portion 41.

In this manner, during the opening operation of the opening/closing cover 12A, the swing portion 6A starting to swing to the second inclined portion 4A side first comes into contact with the opening portion 42.

As shown in FIG. 5, the opening portion 42 is a portion inclined obliquely downward at a predetermined inclination angle β1.

The inclination angle β1 in this case is set to an angle substantially the same as the inclination angle α1 of the closing portion 32 in the first inclined portion 3A. The angle is set to an angle smaller than the inclination angle (for example, β2) of the other portion (for example, a pushing-up portion 43 (to be described later)) of the inclined portion 41.

In addition, as shown in FIG. 5, the inclined portion 41 in the second inclined portion 4A has a pushing-up portion 43 continuously provided from a downstream side end portion (lower end) 42*b* of the opening portion 42 in the closing direction Da2 of the opening/closing cover 12A.

When the opening/closing cover 12A starts to be closed, the pushing-up portion 43 becomes a portion moving the opening/closing cover 12A so that the swing portion 6A swings to the first inclined portion 3A side by coming into contact with the swing portion 6A swinging to the second inclined portion 4A side. The pushing-up portion 43 is a portion inclined obliquely downward at a predetermined inclination angle β2. For example, the inclination angle β2 is set to an angle larger than the inclination angle β1 of the opening portion 42 (β2>β1).

Incidentally, in the first structural body 2A, the first inclined portion 3A and the second inclined portion 4A including the support portion 21 can be manufactured as an integral body by using a material such as synthetic resin.

In addition, for example, as shown in FIGS. 2 and 3, the opening/closing cover 12A is set so that one end portion 12*e* of the opening/closing cover 12A is brought into a closed state by abutting on a stop portion 17 provided in a corresponding portion in the opening/closing portion 14 of the main body 10A. For example, as an abutting portion, the one end portion 12*e* is provided in a portion separated from the hinge 13. In addition, the position of the opening/closing cover 12A when the one end portion 12*e* of the opening/closing cover 12A abuts on the stop portion 17 is a normal closing position.

Operation of Opening/Closing Mechanism when Closing Opening/Closing Cover

Next, an operation of the opening/closing mechanism 1A when closing the opening/closing cover 12A will be described.

First, the opening/closing cover 12A in an opened state shown in FIGS. 1B and 2 is caused to pivot around the hinge 13 in the closing direction Da2. In this manner, the opening/closing cover 12A starts to be closed to close the opening/closing portion 14 of the main body 10A.

In a case where the closing operation of the opening/closing cover 12A is performed, in the opening/closing mechanism 1A, as shown in FIG. 8A, the first structural body 2A disposed on the opening/closing cover 12A side starts to move close to the second structural body 5A disposed on the main body 10A side.

In this case, in the opening/closing mechanism 1A, as shown in FIGS. 8A and 8B, the swing portion 6A in the second structural body 5A is brought into a state of entering a portion (gap space Sa) between the first inclined portion 3A and the second inclined portion 4A of the first structural body 2A moving in the closing direction Da2. In other words, the first structural body 2A is brought into a state where the swing portion 6A in the second structural body 5A is introduced into the portion between the first inclined portion 3A and the second inclined portion 4A.

In this case, as shown in a part (A) in FIG. 7 and FIG. 8B, the swing portion 6A is in a state where the swing body 61 swings to the lower side swing position P1.

Subsequently, the opening/closing cover 12A is further pushed in the closing direction Da2.

Then, as shown in FIG. 8A, in the first structural body 2A, the pushing-up portion 43 in the inclined portion 41 of the second inclined portion 4A comes into contact with the second contact surface 64 in the swing body 61 of the swing portion 6A swinging to the lower side swing position P1.

In this case, the second inclined portion 4A of the first structural body 2A moves the swing body 61 of the swing portion 6A in the upward direction Ea1 by using the inclination of the pushing-up portion 43 moving in response to the movement of the opening/closing cover 12A in the closing direction Da2. In this manner, the swing body 61 is moved to swing to the first inclined portion 3A side.

In this case, as shown in FIG. 8A, the second inclined portion 4A receives the force J1 in which the inclined pushing-up portion 43 swings from the swing body 61 toward the lower side swing position P1, from the tension applying member 67. Therefore, a portion of ae component force of the force J1 is received as the force Fa in the opening direction Da1 of the opening/closing cover 12A.

In this manner, the opening/closing cover 12A receives the force Fa when closed. Therefore, the opening/closing cover 12A is not stopped while the closing operation is performed.

In this case, the second inclined portion 4A moves the swing body 61 until the pushing-up portion 43 reaches the intermediate swing position P2 (part (B) in FIG. 7) which is the switching point. In this manner, as shown in a part (B) in FIG. 7B, and FIGS. 9A, and 9B, the swing body 61 of the swing portion 6A temporarily reaches and passes through the intermediate swing position P2.

On the other hand, in the first inclined portion 3A, as shown in FIGS. 8A and 8B, the contact avoiding portion 33 moves in the closing direction Da2 of the opening/closing cover 12A without coming into contact with the swing body 61 of the swing portion 6A, and in this case, a portion of the contact avoiding portion 33 starts to enter and pass through the first opening portion 16*a* in the attachment frame 16.

Subsequently, the swing body 61 of the swing portion 6A temporarily reaches the intermediate swing position P2 (part (B) in FIG. 7) as shown in FIGS. 9A and 9B, and thereafter, starts to swing to move close to the first inclined portion 3A side.

In this case, the second inclined portion 4A of the first structural body 2A is brought into a state where the inclined portion 41 is separated from the swing body 61 of the swing portion 6A. In addition, as shown in FIGS. 9A and 9B, in the second inclined portion 4A, the pushing-up portion 43 moves in the closing direction Da2 of the opening/closing cover 12A without coming into contact with the swing body 61 of the swing portion 6A. In this case, a portion of the pushing-up portion 43 starts to enter and pass through the second opening portion 16*b* in the attachment frame 16.

In addition, as shown in FIGS. 9A and 9B, after the contact avoiding portion 33 in the inclined portion 31 passes through the swing body 61, the first inclined portion 3A in this case is brought into a state where the closing portion 32 in the inclined portion 31 moves close to and faces the swing body 61.

Subsequently, as shown in FIG. 10B, the swing body 61 of the swing portion 6A comes into contact with the closing portion 32 of the first inclined portion 3A, and continues to swing to the first inclined portion 3A side.

In this case, as shown in FIG. 10A, the first inclined portion 3A of the first structural body 2A receives the force J2 in which the inclined closing portion 32 swings from the swing body 61 toward the upper side swing position P3 (part (C) in FIG. 7), from the tension applying member 67. Therefore, a portion of the component force of the force J2 is received as the force Fb in the closing direction Da2 of the opening/closing cover 12A.

In this manner, the opening/closing cover 12A receives the force Fb when closed. Therefore, the closing operation is assisted by the opening/closing mechanism 1A.

Finally, as shown in FIG. 3, in a case where an abutting portion 12*e* of the opening/closing cover 12A abuts on the stop portion 17 in the opening/closing portion 14 of the main body 10A, the opening/closing cover 12A reaches the normal closing position.

In the opening/closing mechanism 1A, as shown in FIGS. 4A and 4B, abutting end portions 21*e* formed by protruding from the upper end of the support portion 21 of the first structural body 2A to exist on both sides of the first inclined portion 3A abut on a peripheral portion of the first opening portion 16*a* of the attachment frame 16. In this manner, the opening/closing cover 12A also reaches the normal closing position.

In this case, in the opening/closing mechanism 1A, as shown in FIGS. 3, 10A, and 10B, the swing body 61 of the swing portion 6A swinging toward the upper side swing position P3 is continuously in contact with the closing portion 32 in the first inclined portion 3A of the first structural body 2A.

In this manner, in the opening/closing mechanism 1A, the first inclined portion 3A of the first structural body 2A continuously receives the force Fb in the closing direction Da2 of the opening/closing cover 12A from the swing body 61 of the swing portion 6A. In this manner, the swing portion 6A in the second structural body 5A continues to apply the force Fb in the closing direction Da2 to the first inclined portion 3A, thereby holding the opening/closing cover 12A in a closed state.

In the opening/closing mechanism 1A, a state in this case is a state where the engagement when the opening/closing cover 12A is closed is completed.

In addition, compared to a case where the swing body 61 of the swing portion 6A in the opening/closing mechanism 1A holds the opening/closing cover 12A in the closed state without coming into contact with the closing portion 32 in the first inclined portion 3A, the opening/closing cover 12A continuously receives the force Fb in the closing direction Da2. In this manner, the opening/closing cover 12A is held in the closed state where rattling is unlikely to occur in the opening/closing portion 14 of the main body 10A.

As described above, in the device 100A including the opening/closing mechanism 1A according to the first exemplary embodiment, when the opening/closing cover 12A is closed, the opening/closing cover 12A is normally closed at the normal closing position without being stopped before reaching the normal closing position.

Operation of Opening/Closing Mechanism when Opening Opening/Closing Cover

Next, an operation of the opening/closing mechanism 1A when opening the opening/closing cover 12A will be described.

First, the opening/closing cover 12A in the closed state shown in FIGS. 1A and 3 is caused to pivot around the hinge 13 in the opening direction Da1. In this manner, the opening/closing cover 12A starts to be opened so that the opening/closing portion 14 of the main body 10A is exposed outward.

When the opening operation of the opening/closing cover 12A is performed, in the opening/closing mechanism 1A, as is clear referring back to FIGS. 10A to 9B, the first structural body 2A starts to be gradually separated from a completed state of engaging with the second structural body 5A.

In this case, in the opening/closing mechanism 1A, as shown in FIGS. 8A and 8B, the first inclined portion 3A and the second inclined portion 4A in the first structural body 2A moving in the opening direction Da1 move to be separated from the swing portion 6A in the second structural body 5A.

In this case, as shown in a part (C) in FIG. 7C and FIG. 10B, the swing portion 6A is in a state where the swing body 61 swings to the upper side swing position P1.

Subsequently, the opening/closing cover 12A further moves in the opening direction Da1.

Then, in the first structural body 2A, the closing portion 32 in the first inclined portion 3A moves the swing body 61 of the swing portion 6A swinging to the upper side swing position P3 and continuously in contact with the closing portion 32 to swing toward the second inclined portion 4A side.

In this case, the first inclined portion 3A of the first structural body 2A moves the swing body 61 in the downward direction Ea2 by using the inclination of the closing portion 32 moving in response to the movement of the opening/closing cover 12A in the closing direction Da2, and starts to cause the swing body 61 to swing toward the second inclined portion 4A side.

As shown in FIG. 10A, the first inclined portion 3A in this case continuously receives the force Fb in the closing direction Da2 of the opening/closing cover 12A from the swing body 61, and moves the swing body 61 in the downward direction Ea2 against the force Fb.

Incidentally, in a case where the opening operation of the opening/closing cover 12A is interrupted in this stage, the opening/closing cover 12A is moved in the closing direction Da2 by the opening/closing mechanism 1A, and returns to the closed state.

In this case, the first inclined portion 3A moves the swing body 61 until the closing portion 32 reaches the intermediate swing position P2 which is the switching point. In this manner, as shown in a part (B) in FIG. 7B, and FIGS. 9A, and 9B, the swing body 61 of the swing portion 6A temporarily reaches and passes through the intermediate swing position P2.

On the other hand, as shown in FIGS. 10A and 10B, in the second inclined portion 4A of the first structural body 2A, the inclined portion 41 starts to move in the opening direction Da1 of the opening/closing cover 12A without coming into contact with the swing body 61 of the swing portion 6A.

Subsequently, as shown in FIGS. 9A and 9B, the swing body 61 of the swing portion 6A temporarily reaches the intermediate swing position P2 (part (B) in FIG. 7), and thereafter, starts to swing to the second inclined portion 4A side.

In this case, the swing body 61 of the swing portion 6A comes into contact with the opening portion 42 in the inclined portion 41 of the second inclined portion 4A, and continues swinging to the second inclined portion 4A side.

In this case, as is clear referring back to FIGS. 9A to 8A, in the second inclined portion 4A, the inclined opening portion 42 receives the force J1 swinging toward the lower side swing position P1 from the swing body 61. Therefore, a portion of the component force of the force J1 is received as the force Fa in the opening direction Da1 of the opening/closing cover 12A.

In this manner, the opening/closing cover 12A receives the force Fa when opened. Therefore, the opening operation is assisted by the opening/closing mechanism 1A.

Finally, as shown in FIG. 2, the first inclined portion 3A and the second inclined portion 4A of the first structural body 2A are brought into a separated state from the swing portion 6A in the second structural body 5A. In this manner, the engagement is completely released by the opening/closing mechanism 1A. In this case, as shown in a part (A) in FIG. 7A and FIG. 8B, the swing body 61 of the swing portion 6A swings to the lower side swing position P1 (part (A) in FIG. 7), and is brought into a stopped state.

In addition, in a case where the opening operation of the opening/closing cover 12A is further continued, the opening/closing cover 12A is brought into a completely opened state as shown in FIG. 1B.

In the device 100A including the opening/closing mechanism 1A, when the opening/closing cover 12A is closed after being opened, even in a case where the swing body 61 of the swing portion 6A is brought into an abnormal state of erroneously swinging to the upper side swing position P3 due to some factors as shown in FIG. 11 and a part (A) in FIG. 12 instead of the normal lower side swing position P1 as shown in a part (B) in FIG. 12, the abnormal state can be dealt with as described below.

Incidentally, in the opening/closing mechanism 1A, when the opening/closing cover 12A is closed, in an abnormal state where the swing body 61 of the swing portion 6A swings to the upper side swing position P3, even in a case where the opening/closing cover 12A is to be closed as shown in FIG. 11, the first inclined portion 3A abuts on the swing body 61, and the closing operation cannot be continued any more.

That is, as shown in FIGS. 1B, 2, 11, and a part (A) in FIG. 12, when the opening/closing cover 12A is opened, the swing portion 6A in the opening/closing mechanism 1A is brought into a visible state from outside. That is, the swing portion 6A is configured to be exposed outward to such an extent that a user's hand can reach the swing portion 6A.

In this manner, in the device 100A, when the opening/closing cover 12A is closed, even in the abnormal state where the swing body 61 of the swing portion 6A swings to the upper side swing position P3, a user's hand can grasp the swing body 61 of the swing portion 6A in the abnormal state, and can manually cause the swing body 61 of the swing portion 6A to swing to the lower side swing position P1 (refer to FIG. 12).

As a result, in the device 100A, the closing operation of the opening/closing cover 12A can be normally performed without being hindered by the swing body 61 of the swing portion 6A in the abnormal state.

Second Exemplary Embodiment

FIG. 13 is a view conceptually showing an opening/closing mechanism 1B according to a second exemplary embodiment of the present disclosure, and is a perspective view showing a state when the opening/closing cover is opened. FIG. 14 is a schematic side view of a first structural body 2B in the opening/closing mechanism 1B.

The opening/closing mechanism 1B is different from the opening/closing mechanism 1A according to the first exemplary embodiment in that the partially changed first structural body 2B is adopted instead of the first structural body 2A in the first exemplary embodiment. Except for the difference, the opening/closing mechanism 1B has the same configuration as the opening/closing mechanism 1A.

Therefore, hereinafter, the same reference numerals will be assigned to common elements, and description thereof will be omitted unless necessary.

As shown in FIGS. 13 and 14, the first structural body 2B in the opening/closing mechanism 1B has the same configuration as the opening/closing mechanism 1A according to the first exemplary embodiment except that the first structural body 2B is changed by adopting the first inclined portion 3B to which an abnormality releasing portion 36 is added.

The abnormality releasing portion 36 is a portion that comes into contact with the swing body 61 of the swing portion 6A in an abnormal state which swings to the first inclined portion 3B side (upper side swing position P3) during the closing operation of the opening/closing cover 12A, and moves the swing body 61 to swing toward the second inclined portion 4A side (lower side swing position P1).

The abnormality releasing portion 36 is continuously provided in the downstream side end portion (lower end) 33*e* in the closing direction Da2 of the opening/closing cover 12A in the inclined portion 31 in the first inclined portion 3B. The abnormality releasing portion 36 is a portion inclined obliquely upward at a predetermined inclination angle γ1 from the end portion 33*e* of the inclined portion 31. For example, the inclination angle γ1 is set in view of a configuration in which the abnormality releasing portion 36 can gradually push down the swing body 61 in the downward direction Ea2 by coming into contact with the swing body 61 in the abnormal state during the closing operation of the opening/closing cover 12A.

In addition, compared to the protruding portion 30A in the first exemplary embodiment, a protruding portion 30B in which the abnormality releasing portion 36 is additionally installed has a shape in which the downstream side in the closing direction Da2 is lengthened by the additionally installed amount of the abnormality releasing portion 36.

In the opening/closing mechanism 1B, when the opening/closing cover 12A is closed, in an abnormal state where the swing body 61 of the swing portion 6A swings to the upper side swing position P3, as shown in FIGS. 13 and 15A, the abnormality releasing portion 36 in the first inclined portion 3B of the first structural body 2B comes into contact with the swing body 61 in the abnormal state during the closing operation of the opening/closing cover 12A.

Subsequently, in a case where the closing operation of the opening/closing cover 12A is continued, the swing body 61 is gradually pushed down in the downward direction Ea2 by coming into contact with the abnormality releasing portion 36 moving in the closing direction Da2 of the opening/closing cover 12A. While the swing body 61 is pushed down, the swing body 61 passes through the intermediate swing position P2 as shown in FIG. 15B. Finally, a state of the swing body 61 is corrected to a normal state (refer to a part (A) in FIG. 7) where the swing body 61 swings to the lower side swing position P1.

As a result, in the opening/closing mechanism 1B, compared to a case where the first inclined portion 3B does not have the abnormality releasing portion 36, the swing portion 6A in the abnormal state can be easily corrected without requiring a special operation during a process of the closing operation of the opening/closing cover 12A, and the closing operation of the opening/closing cover 12A can be normally performed.

Third Exemplary Embodiment

FIGS. 16A and 16B are perspective views of a device 100B including the opening/closing mechanism 1 according to a third exemplary embodiment of the present disclosure. FIG. 17 is a schematic front view of the device 100B.

Device Including Opening/Closing Mechanism

The device 100B including the opening/closing mechanism 1 is an example of an image forming device, and includes a housing 10B which is another example of the main body.

The housing 10B is configured to have a required outer shape, and the outside is covered with an exterior cover 11.

In addition, as shown in FIG. 17, in a required portions inside the housing 10B, an image forming unit 120 is disposed as a functional unit 102A, and a medium supply unit 130 is disposed as a functional unit 102B.

The image forming unit 120 is a structural portion that forms an image on a recording medium 109. For example, the image forming unit 120 is configured to include an image forming device using an electrophotographic method.

The image forming unit 120 using the above-described method includes an image holding body such as a photoconductor having a surface for holding an image, equipment such as a charging device, an exposure device, a developing device, and a transfer device which are disposed around the image holding body, and a fixing device disposed at a position separated from the image holding body (all are not shown). In addition, the image forming unit 120 using the above-described method also includes related equipment such as a developer replenishing device, an image processing device, and a control device (all are not shown).

The medium supply unit 130 is a structural portion that supplies the recording medium 109 to the image forming unit 120.

For example, the medium supply unit 130 is configured to include two vertically disposed stages of medium supply units 130A and 130B. The medium supply units 130A and 130B can be pulled out to the front surface side of the main body 10B. In addition, the medium supply units 130A and 130B are respectively covered with front surface covers 19*a* and 19*b* on the front surface side of the main body 10B.

As the recording medium 109, a sheet-shaped medium which can be transported inside the housing 10B and can form an image by the image forming unit 120 is used. A one dot chain line with an arrow in FIG. 17 indicates a transport path of the recording medium 109.

In addition, the housing 10B includes the image forming unit 120 and the medium supply unit 130. Therefore, a medium discharge unit 140 for discharging and accommodating the recording medium 109 on which the image is formed is provided.

For example, the medium discharge unit 140 in the third exemplary embodiment is provided as a so-called in-body discharge unit which is a portion having an open discharge space in which a portion of the front surface and the right side surface is open in a portion biased to the right side in the upper portion of the housing 10B. A reference numeral 142 in FIG. 17 indicates a medium accommodating surface, and a reference numeral 142*b* indicates a slope portion of the medium accommodating surface 142.

Furthermore, as shown in FIGS. 16A and 16B, the device 100B is configured to serve as opening/closing covers 12A and 12C in which a portion of the exterior cover 11 is an example of the opening/closing body. The device 100B may include the opening/closing cover other than the opening/closing covers 12A and 12C.

The opening/closing cover 12A is a rectangular cover that constitutes a portion of an exterior cover 11*e* disposed on the front surface side of the device 100B. In addition, the opening/closing cover 12A is a vertical opening type opening/closing cover that covers and exposes the image forming unit 120. Furthermore, the opening/closing cover 12A is configured to serve as a cover that covers a slope portion 142*b* of the medium accommodating surface 142 in the medium supply unit 130.

For example, the opening/closing cover 12C is a rectangular cover that constitutes a portion of an exterior cover 11*f* disposed on the right side surface of the device 100B. In addition, the opening/closing cover 12C is a vertical opening type opening/closing cover having the same type as the opening/closing cover 12A.

A reference numeral 14B shown in FIGS. 16A and 16B indicates an opening/closing portion when the main body 10B is opened/closed by the opening/closing cover 12A, and reference numerals 15*c* and 15*d* indicate respective handle portions of the opening/closing covers 12A and 12C.

Opening/Closing Mechanism

The device 100B has either the opening/closing mechanism 1A according to the first exemplary embodiment or the opening/closing mechanism 1B according to the second exemplary embodiment, as the opening/closing mechanism 1 that engages with the opening/closing cover 12A when closed.

One opening/closing cover 12C is provided with the opening/closing mechanism or the opening/closing mechanism having a configuration different from a configuration of the opening/closing mechanism 1 in the opening/closing cover 12A, but may be provided with the same opening/closing mechanism 1.

Therefore, in the device 100B consisting of the image forming device including any one of the opening/closing mechanisms 1A and 1B, when the opening/closing cover 12A is closed, the opening/closing cover 12A is also normally closed at the normal closing position without being stopped before reaching the normal closing position.

Therefore, the device 100B is provided with a detection switch for detecting whether the opening/closing cover 12A is physically pressed and closed. In a case where the image forming unit 120 is configured to be operable when the detection switch detects the pressing, for example, the following problem can be avoided.

That is, in the device 100B adopting the configuration relating to the above-described detection switch, in some cases, the detection switch may detect that the opening/closing cover 12A is closed even though the opening/closing cover 12A is stopped before reaching the normal closing position. In this case, when an image forming operation in the device 100B starts, there is a possibility that the opening/closing cover 12A may vibrate to generate an abnormal noise, or the opening/closing cover 12A may be unexpectedly opened in some cases.

In this regard, in the device 100B provided with any one of the opening/closing mechanisms 1A and 1B, the opening/closing cover 12A is normally closed at the normal closing position without being stopped before reaching the normal closing position. Therefore, the above-described problem can be avoided.

Modification Examples

The present disclosure is not limited to the contents described as examples in the first to third exemplary embodiments. For example, the present disclosure also includes modification examples as described below.

In the first and second exemplary embodiments, configurations having forms in which the inclined portions 31 and 41 are formed in the plate-shaped protruding portions 30A, 30B, and 40A as the first swing portion 3A and 3B and the second inclined portion 4A in the first structural bodies 2A and 2B of the opening/closing mechanism 1A and 1B have been described as examples. However, for example, a configuration having the following form may be adopted.

That is, the first swing portions 3A and 3B and the second inclined portion 4A may have a configuration in which the inclined portions 31 and 41 are formed in a rod-shaped base material, for example.

In addition, the first swing portions 3A and 3B and the second inclined portion 4A are not limited to the configuration example in which the first swing portions 3A and 3B and the second inclined portion 4A are disposed at an interval on a straight line in the upward-downward direction of the support portion 21 described as an example in the first and second exemplary embodiments. As long as the contact with the swing portion 6A is available and the above-described forces Fa and Fb can be obtained within a predetermined range, any configuration may be adopted in which the first swing portions 3A and 3B and the second inclined portion 4A are disposed to have a positional relationship of being shifted in the rightward-leftward direction.

In addition, the first inclined portion 3A in the first structural body 2A of the opening/closing mechanism 1A in the first exemplary embodiment may have a shape in which the contact avoiding portion 33 is not provided.

In addition, in the first and second exemplary embodiments, an electric type swing portion that causes the swing body 61 to swing by using a driving force of a motor may be adopted instead of the swing portion 6A in the second structural body 5A of the opening/closing mechanisms 1A and 1B.

In this case, for example, the electric type swing portion adopts a configuration provided with a sensor for detecting a swing position of the swing body 61 by connecting the swing shaft 18 of the swing body 61 to a drive device including the motor.

The electric type swing portion may be configured to use the following case as a trigger. In a case where the swing body 61 swings due to the contact between the first inclined portions 3A and 3B and the second inclined portion 4A in the first structural bodies 2A and 2B, when it is detected that the swing body 61 is moved from the lower side swing position P1 to the intermediate swing position P2, the drive device is operated to cause the swing body 61 to swing toward the upper side swing position P3 by using the driving force of the drive device.

In addition, the electric type swing portion may be configured as follows. When it is detected that the swing body 61 is moved from the upper side swing position P3 to the intermediate swing position P2, the drive device is operated to cause the swing body 61 to swing toward the lower side swing position P1 by using the driving force of the drive device.

In addition, in the first and second exemplary embodiments, for example, instead of the swing restricting portion 7A, a swing restricting portion having the first stop portion 72 and the second stop portion 73 which have a protrusion shape may be adopted.

In addition, in the third exemplary embodiment, the image forming unit using the electrophotographic method is adopted as the image forming unit 120. However, an image forming unit using other image forming methods may be adopted as the image forming unit 120. For example, other image forming methods include a droplet ejection method (ink ejection method or the like) and a wet development method.

In the first to third exemplary embodiments, a case where one of the opening/closing mechanisms 1A and 1B is provided in one opening/closing cover 12A has been described as an example. However, the plurality of opening/closing mechanisms 1A and 1B can also be provided in one opening/closing cover 12A.

In addition, the opening/closing body for which the opening/closing mechanism 1 represented by the opening/closing mechanisms 1A and 1B is adopted is not limited to the opening/closing cover 12A, and may be an opening/closing body having a form such as an opening/closing door and a drawer.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An opening/closing mechanism comprising:

a first inclined portion disposed in an opening/closing body that opens/closes while a first shaft serves as a fulcrum in a main body;

a second inclined portion disposed in the opening/closing body; and a swing portion that swings between the first inclined portion and the second inclined portion while a second shaft disposed in the main body serves as a fulcrum, wherein during a closing operation of the opening/closing body, the swing portion is configured to apply a force in a closing direction of the opening/closing body to the first inclined portion by coming into contact with the first inclined portion, and during an opening operation of the opening/closing body, the swing portion is configured to apply a force in an opening direction of the opening/closing body to the second inclined portion by coming into contact with the second inclined portion.

2. The opening/closing mechanism according to claim 1, wherein the first inclined portion has a portion existing on a side facing the first shaft and inclined obliquely downward, and the second inclined portion has a portion separated from the first inclined portion toward a side closer to the first shaft, existing on a side facing the first inclined portion, and inclined obliquely downward.

3. The opening/closing mechanism according to claim 1, wherein the swing portion includes a first attachment portion provided in the main body, a second attachment portion provided at a position further separated from the first attachment portion than the second shaft of the swing portion, and a tension applying member attached to apply tension between the first attachment portion and the second attachment portion, in a case where the first inclined portion or the second inclined portion comes into contact with the swing portion during an opening/closing operation of the opening/closing body, the swing portion swings by being switched to either side of the first inclined portion or the second inclined portion in a state where the tension is applied.

4. The opening/closing mechanism according to claim 2, wherein the swing portion includes a first attachment portion provided in the main body, a second attachment portion provided at a position further separated from the first attachment portion than the second shaft of the swing portion, and a tension applying member attached to apply tension between the first attachment portion and the second attachment portion, and in a case where the first inclined portion or the second inclined portion comes into contact with the swing portion during an opening/closing operation of the opening/closing body, in a state where the tension is applied, the swing portion swings by being switched to either side of the first inclined portion or the second inclined portion.

5. The opening/closing mechanism according to claim 2, wherein an inclined portion of the first inclined portion has a closing portion with which the swing portion is continuously in contact when the swing portion swings to the first inclined portion side during the closing operation of the opening/closing body.

6. The opening/closing mechanism according to claim 5, wherein the swing portion holds the opening/closing body in a closed state while being in contact with the closing portion.

7. The opening/closing mechanism according to claim 5, wherein when the opening/closing body starts to be opened, the closing portion functions as a portion which causes the swing portion in contact with the closing portion to start to swing to the second inclined portion side.

8. The opening/closing mechanism according to claim 2, wherein an inclined portion of the second inclined portion has an opening portion with which the swing portion starting to swing to the second inclined portion side first comes into contact during the opening operation of the opening/closing body.

9. The opening/closing mechanism according to claim 8, wherein the inclined portion of the second inclined portion has a pushing-up portion continuously provided from a downstream side end portion in the closing direction of the opening/closing body, and when the opening/closing body starts to be closed, the pushing-up portion comes into contact with the swing portion swinging to the second inclined portion side, and moves the swing portion to swing to the first inclined portion side.

10. The opening/closing mechanism according to claim 3, wherein the main body is provided with a swing restricting portion having a first stop portion that stops the swing of the swing portion by coming into contact with the swing portion when the swing portion swings to the first inclined portion side, and a second stop portion that stops the swing of the swing portion by coming into contact with the swing portion when the swing portion swings to the second inclined portion side.

11. The opening/closing mechanism according to claim 4, wherein the main body is provided with a swing restricting portion having a first stop portion that stops the swing of the swing portion by coming into contact with the swing portion when the swing portion swings to the first inclined portion side, and a second stop portion that stops the swing of the swing portion by coming into contact with the swing portion when the swing portion swings to the second inclined portion side.

12. The opening/closing mechanism according to claim 1, wherein the swing portion is in a visible state when the opening/closing body is opened.

13. The opening/closing mechanism according to claim 2, wherein the swing portion is in a visible state when the opening/closing body is opened.

14. The opening/closing mechanism according to claim 3, wherein the swing portion is in a visible state when the opening/closing body is opened.

15. The opening/closing mechanism according to claim 4, wherein the swing portion is in a visible state when the opening/closing body is opened.

16. The opening/closing mechanism according to claim 5, wherein the swing portion is in a visible state when the opening/closing body is opened.

17. The opening/closing mechanism according to claim 12, wherein the swing portion is manually swingable when the opening/closing body is opened.

18. The opening/closing mechanism according to claim 2, wherein the first inclined portion has an abnormality releasing portion continuously provided in a downstream side end portion in the closing direction of the opening/closing body, and during the closing operation of the opening/closing body, the abnormality releasing portion comes into contact with the swing portion in a state of swinging to the first inclined portion side, and moves the swing portion to swing to the second inclined portion side.

19. A device including an opening/closing mechanism, comprising:

a main body;

one or a plurality of opening/closing bodies attached to the main body to be openable/closable; and the opening/closing mechanism according to claim 1, which is provided in the main body and at least one opening/closing body of the opening/closing bodies.

20. The device including an opening/closing mechanism according to claim 19, wherein the main body is provided with an image forming unit that forms an image on a recording medium.

* * * * *